US008965206B2

(12) United States Patent
Sugawa et al.

(10) Patent No.: US 8,965,206 B2
(45) Date of Patent: Feb. 24, 2015

(54) NETWORK SYSTEM, STATION-SIDE APPARATUS, AND METHOD OF CONTROLLING COMMUNICATIONS

(71) Applicant: Hitachi, Ltd., Tokyo (JP)

(72) Inventors: Jun Sugawa, Kamakura (JP); Toshiyuki Odaka, Fuchu (JP); Hidehiro Toyoda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 57 days.

(21) Appl. No.: 13/783,646

(22) Filed: Mar. 4, 2013

(65) Prior Publication Data

US 2014/0161456 A1    Jun. 12, 2014

(30) Foreign Application Priority Data

Dec. 10, 2012    (JP) .................. 2012-269224

(51) Int. Cl.
*H04J 14/00*  (2006.01)
*H04J 14/02*  (2006.01)

(52) U.S. Cl.
CPC ......... *H04J 14/0227* (2013.01); *H04J 14/0246* (2013.01); *H04J 14/0247* (2013.01); *H04J 14/025* (2013.01); *H04J 14/0252* (2013.01); *H04J 14/026* (2013.01); *H04J 14/0282* (2013.01); *H04J 14/0254* (2013.01); *H04J 14/0257* (2013.01); *H04J 14/0267* (2013.01)
USPC ............................................. 398/69; 398/72

(58) Field of Classification Search
CPC ........................... H04J 14/0257; H04J 14/026

USPC .................... 398/68–73, 75, 79–97
See application file for complete search history.

(56) References Cited

U.S. PATENT DOCUMENTS

| 5,930,018 | A | * | 7/1999 | Effenberger ................... 398/161 |
| 7,526,206 | B1 | * | 4/2009 | Rolenz ........................... 398/140 |
| 2009/0175622 | A1 | * | 7/2009 | Lee et al. ......................... 398/79 |
| 2009/0269072 | A1 | * | 10/2009 | Liaw et al. ....................... 398/98 |
| 2010/0158531 | A1 | * | 6/2010 | Chung et al. .................... 398/79 |
| 2010/0316381 | A1 | * | 12/2010 | de Lind van Wijngaarden ................... 398/58 |

FOREIGN PATENT DOCUMENTS

JP    2009-010530 A    1/2009

OTHER PUBLICATIONS

S. Kimura, "10-Gbit/s TDM-PON and over-40-Gbit/s WDM/TDM-PON systems with OPEX-effective burst-mode technologies", OFC2009, OWH-6, Mar. 2009.

* cited by examiner

*Primary Examiner* — David Payne
*Assistant Examiner* — Casey Kretzer
(74) *Attorney, Agent, or Firm* — Mattingly & Malur, PC

(57) ABSTRACT

An aspect of this invention is a network system including subscriber apparatuses and a station-side apparatus for communicating with the subscriber apparatuses. The station-side apparatus communicates with the subscriber apparatuses using wavelengths. The station-side apparatus determines a wavelength to be used by each of at least one subscriber apparatus of the subscriber apparatuses based on effective transmission rates used by the subscriber apparatuses in communications with the station-side apparatus.

13 Claims, 10 Drawing Sheets

| ONU IDENTIFIER 1711 | FEC CODE RATE 1712 | WAVEVLENGTH IDENTIFIER 1713 |
|---|---|---|
| 1 | rA(=1) | 1 |
| 2 | rB(=0.875) | 4 |
| 3 | rB(=0.875) | 3 |
| ... | ... | ... |
| 256 | rA(=1) | 2 |

ONU WAVELENGTH MANAGEMENT TABLE

| 1721 | 1722 | 1723 | 172 |
|---|---|---|---|
| ONU IDENTIFIER | TRANSMISSION RATE | WAVELENGTH IDENTIFIER | |
| 1 | 10G | 1 | |
| 2 | 1G | 4 | |
| 3 | 10G | 3 | |
| ... | ... | ... | |
| 256 | 10G | 2 | |

ONU WAVELENGTH MANAGEMENT TABLE

NETWORK SYSTEM, STATION-SIDE APPARATUS, AND METHOD OF CONTROLLING COMMUNICATIONS

CLAIM OF PRIORITY

The present application claims priority from Japanese patent application JP2012-269224 filed on Dec. 10, 2012, the content of which is hereby incorporated by reference into this application.

BACKGROUND OF THE INVENTION

This invention relates to a station-side apparatus.

The recent prevalence of the Internet is enhancing the demand for higher-speed network communications. To meet this demand for higher-speed communications, ADSL (Asymmetric Digital Subscriber Line) or PON (Passive Optical Network) is growing. The PON includes B-PON (Broadband PON), E-PON (Ethernet PON), and G-PON (Gigabit-capable PON).

The PON is a network system which connects an accommodation station (OLT: Optical Line Terminal) installed in a vendor's station and network units (ONUs: Optical Network Units) installed in user premises; in the PON, the signal in an optical fiber connected to the OLT is split into a plurality of fibers with an optical splitter; the plurality of fibers are connected to the ONUs one by one. If a network is configured with the PON, low cost fiber installation and high-speed communications by employment of optical transmission are attained. For this reason, the PON is spreading all over the world.

Among the techniques utilizing the PON, TDM-PON (Time Division Multiplexing Passive Optical Network) is widely employed, which uses optical signals having different wavelengths in downstream transmission from the OLT to ONUs and upstream transmission from the ONUs to the OLT and further applies time-division multiplexing to the signals depending on the ONU. This TDM-PON is employed in B-PON, E-PON, G-PON, 10G-EPON, and XG-PON.

In the TDM-PON, the OLT controls the timing of sending optical signals from ONUs to prevent a conflict among the optical signals from the ONUs in upstream transmission. Specifically, the OLT sends each ONU a control frame to specify a permitted transmission period. Each ONU sends an upstream control signal and upstream data during the period specified by the received control frame.

Each ONU also sends the OLT a control frame to request a required bandwidth to the OLT, based on the data volume of a frame received from the connected terminal. In typical, the permitted transmission period for an ONU is determined through DBA (Dynamic Bandwidth Allocation) control by the OLT. The DBA control is a control method that dynamically determines the period based on the required bandwidth requested by the ONU.

Furthermore, to recover significant optical transmission loss generated in the TDM-PON, it has been generally known to employ FEC (Forward Error Correction), which is a kind of error correction coding. For example, the 10G-EPON (IEEE 802.3av standard) requires employment of Reed-Solomon (255,223) code, which is one of the FEC codes.

A system like the 10G-EPON employs the FEC regardless of transmission loss between OLT and ONUs. However, communications with short-distant ONUs generating small transmission loss do not require the FEC, although communications with long-distant ONUs generating great transmission loss do. Accordingly, in a system like the 10G-EPON, transmission efficiency will be degraded as a result of transmission of optical signals after attaching unnecessary FEC redundant codes to the signals for the short-distant ONUs.

In view of the above, a method for improving the transmission efficiency has been proposed that does not use the FEC in communications with short-distant ONUs but uses the FEC in communications with long-distant ONUs.

As to the DBA control for the TDM-PON, various control methods are known. In order to achieve fair bandwidth allocation to the ONUs, there exists a method of controlling bandwidth allocation which considers data volume information and the degree of FEC redundancy for upstream transmission data to determine upstream data transmission bandwidths to be allocated to individual subscriber's communications apparatuses (for example, refer to JP 2009-010530 A).

In the meanwhile, as a further next generation PON of the 10G-EPON or the XG-PON, there exists WDM/TDM-PON that bundles traditional TDM-PONs with a plurality of wavelengths. This WDM/TDM-PON enables still larger volume of communications by using a plurality of wavelengths.

For this WDM/TDM-PON, a technique has been proposed that dynamically changes the communication wavelength using a wavelength-tunable optical transceiver in each ONU (for example, refer to S. Kimura, "10-Gbit/s TDM-PON and over-40-Gbit/s WDM/TDM-PON systems with OPEX-effective burst-mode technologies", OFC2009, OWH-6, March, 2009)

SUMMARY OF THE INVENTION

The WDM/TDM-PON system attains high transmission efficiency by applying the FEC depending on the distance and the transmission loss and changing the wavelength dynamically. However, if a WDM (Wavelength-Division Multiplexing) PON system employing selectable FEC code rate for each ONU simply assigns wavelengths based on the number of registered ONUs, communication bandwidths (transmission rates) to actually send and receive data will become unfair among a plurality of wavelengths used in the PON system.

It is desired, even in such a case, that the communication bandwidths at the plurality of wavelengths be kept fair in the overall PON system.

This invention has been made in view of this problem and a primary object of this invention is to achieve wavelength assignment to ONUs that can reduce the unfairness in the communication bandwidth among the wavelengths in a WDM/TDM-PON system.

An aspect of this invention is a network system including subscriber apparatuses and a station-side apparatus for communicating with the subscriber apparatuses. The station-side apparatus communicates with the subscriber apparatuses using wavelengths. The station-side apparatus determines a wavelength to be used by each of at least one subscriber apparatus of the subscriber apparatuses based on effective transmission rates used by the subscriber apparatuses in communications with the station-side apparatus.

According to an embodiment of this invention, the unfairness in communication bandwidth among wavelengths can be reduced even if the network system includes ONUs communicating at different effective transmission rates in transmission and receiving.

Objects, configurations, and effects of this invention other than those described above will be clarified in the description of the following embodiments.

DETAILED DESCRIPTION OF THE EMBODIMENTS

Hereinafter, embodiments of this invention will be described in detail with reference to the drawings. The components common to the drawings are assigned the same reference signs. The descriptions about control frames in the PON area are provided based on the control frames defined by the 10G-EPON standard unless specified otherwise.

Embodiment 1

Figure 1:
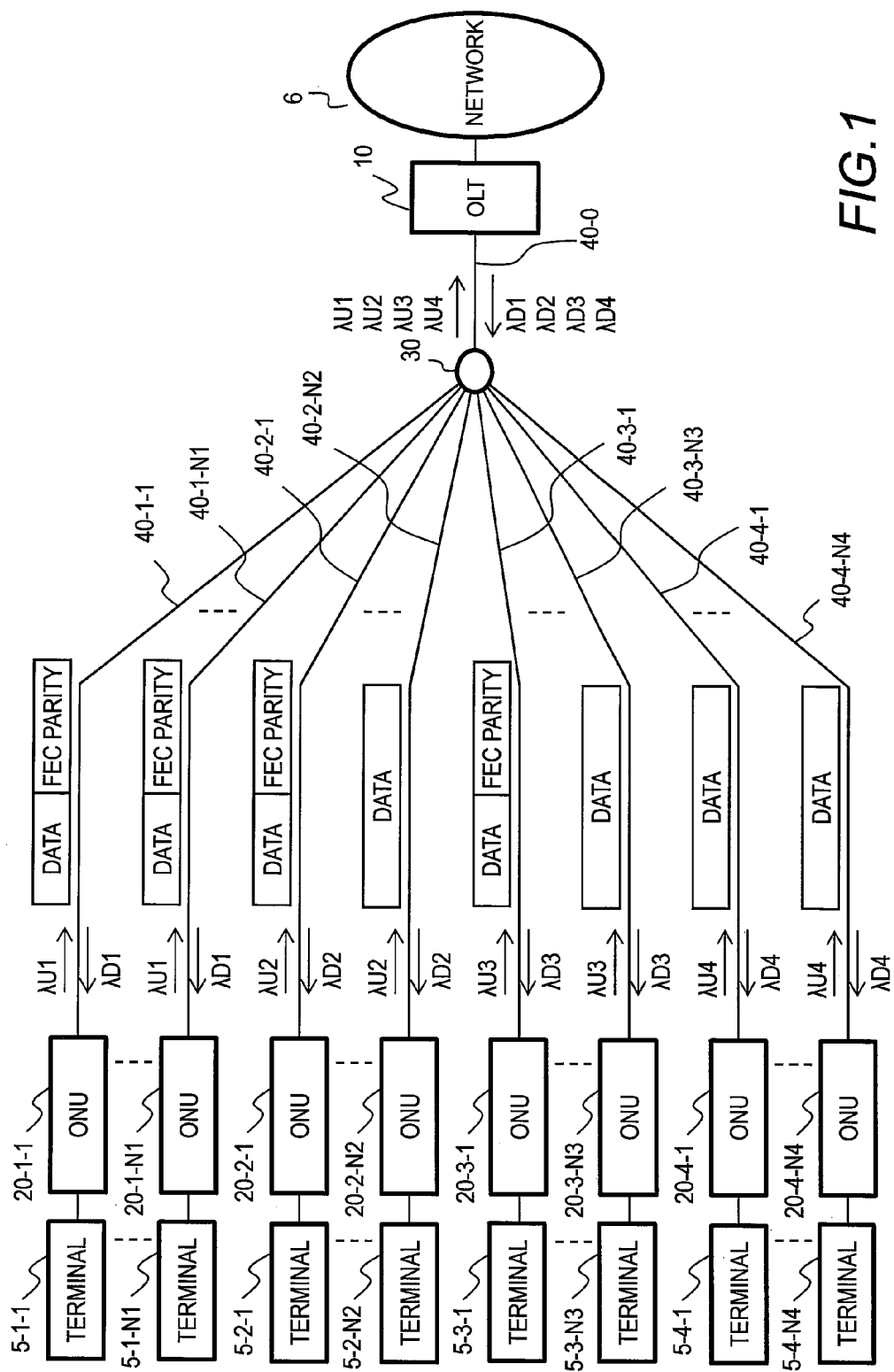
FIG. 1 is a block diagram illustrating an optical access network employing the WDM/TDM-PON in Embodiment 1.

FIG. 1 is a block diagram illustrating an optical access network employing the WDM/TDM-PON in Embodiment 1.

The optical access network in Embodiment 1 includes an OLT 10, an optical splitter 30, a plurality of ONUs 20 (20-1-1 to 20-4-N4), and a plurality of terminals 5 (5-1-1 to 5-4-N4). The OLT 10 is an optical line terminal and the ONU 20 is an optical network unit.

The OLT 10 is connected to the optical splitter 30 via a trunk line optical fiber 40-0. The optical splitter 30 is connected to the ONUs 20-1-1 to 20-4-N4 via branch line optical fibers 40-1-1 to 40-4-N4. The terminals 5-1-1 to 5-4-N4 are connected to their respective ONUs 20-1-1 to 20-4-N4.

Next, methods of downstream transmission and upstream transmission are described. The ONUs 20-1-1 to 20-1-N1 communicate with the OLT 10 using a downstream wavelength λD1 and an upstream wavelength λU1. The ONUs 20-2-1 to 20-2-N2 communicate with the OLT 10 using a downstream wavelength λD2 and an upstream wavelength λU2. The ONUs 20-3-1 to 20-3-N3 communicate with the OLT 10 using a downstream wavelength λD3 and an upstream wavelength λU3. The ONUs 20-4-1 to 20-4-N4 communicate with the OLT 10 using a downstream wavelength λD4 and an upstream wavelength λU4. It should be noted that the wavelengths for upstream communications and downstream communications used by the ONUs 20 are not fixed but dynamically selectable in this WDM/TDM-PON system.

The downstream transmission from the OLT 10 to the ONUs 20 in the WDM/TDM-PON is described. The OLT 10 sends signals addressed to the ONUs 20-1-1 to 20-1-N1 by way of downstream optical signals at the downstream wavelength λD1. The OLT 10 sends signals addressed to the ONUs 20-2-1 to 20-2-N2 by way of downstream optical signals at the downstream wavelength λD2. The OLT 10 sends signals addressed to the ONUs 20-3-1 to 20-3-N3 by way of downstream optical signals at the downstream wavelength λD3. The OLT 10 sends signals addressed to the ONUs 20-4-1 to 20-4-N4 by way of downstream optical signals at the downstream wavelength λD4.

Accordingly, the optical signal sent from the OLT 10 is an optical signal obtained by wavelength-division multiplexing signals having downstream wavelengths λD1, λD2, λD3, and λD4. The wavelength-division multiplex optical signal is fed to the ONUs 20-1-1 to 20-4-N4 through the optical splitter 30 and the optical fibers 40-1-1 to 40-4-N4. Each ONU 20 has a wavelength-tunable optical transceiver that can select wavelengths in transmission and receiving (which will be described later), and can only send and receive signals having specified wavelengths.

When an ONU 20 receives a wavelength-division multiplex downstream optical signal, it only receives a specified wavelength. For example, the ONUs 20-1-1 to 20-1-N1 select only signals having the downstream wavelength λD1 to receive the selected signals. The ONUs 20-2-1 to 20-2-N2 select only signals having the downstream wavelength λD2 to receive the selected signals. The ONUs 20-3-1 to 20-3-N3 select only signals having the downstream wavelength λD3 to receive the selected signals. The ONUs 20-4-1 to 20-4-N4 select only signals having the downstream wavelength λD4 to receive the selected signals.

The downstream optical signal at each wavelength includes signals addressed to ONUs 20 that have been time-division multiplexed. For example, a downstream optical signal at the downstream wavelength λD1 includes signals to the ONU 20-1-1 to 20-1-N1 that have been time-division multiplexed; accordingly, each ONU 20 is capable of analyzing a frame received from the OLT 10, determining whether the frame is addressed to the ONU 20 itself, and selecting only a frame addressed to the ONU 20 itself.

Next, the upstream transmission from the ONUs 20 to the OLT 10 in the WDM/TDM-PON is described. Each ONU 20 selects one of the upstream wavelengths λU1 to λU4 and sends an upstream optical signal having the selected wavelength during a period specified by the OLT 10. It should be noted that the upstream optical signal sent from the ONU 20 is a burst optical signal because the ONU 20 sends the upstream optical signal only in the specified period.

For example, the ONU 20-1-1 to 20-1-N1 send upstream burst optical signals having the upstream wavelength λU1; the ONU 20-2-1 to 20-2-N2 send upstream burst optical signals having the upstream wavelength λU2; the ONU 20-3-1 to 20-3-N3 send upstream burst optical signals having the upstream wavelength λU3; and the ONU 20-4-1 to 20-4-N4 send upstream burst optical signals having the upstream wavelength λU4.

The upstream optical signals (upstream burst optical signals) sent from the ONUs 20 are multiplexed by the optical splitter 30 and fed to the OLT 10. Accordingly, the OLT 10 receives a signal obtained by time-division multiplexing and wavelength-division multiplexing upstream optical signals having upstream wavelengths λU1 to λU4.

In this way, the WDM/TDM-PON bundles traditional TDM-PONs with a plurality of wavelengths. As a result, one OLT 10 can accommodate a larger number of ONUs 20 and the WDM/TDM-PON can provide a larger capacity for data transmission between the OLT 10 and the ONUs 20.

In the network system shown in FIG. 1, the ONUs 20-1-1 to 20-1-N1, the ONUs 20-2-1 to 20-2-(N2-1), and the ONU 20-3-1 employ the FEC in communications with the OLT 10. The ONUs 20-2-N2, the ONUs 20-3-2 to 20-3-N3, and the ONUs 20-4-1 to 20-4-N4 do not employ the FEC in communications with the OLT 10.

All of the ONUs 20 in Embodiment 1 shown in FIG. 1 are assigned the same transmission rate and are configured in advance to send and receive signals at the assigned transmission rate. However, the rate (effective transmission rate) at which an ONU 20 actually sends or receives data may be different from the transmission rate preset to the ONU 20. The example described below is a case where the effective transmission rate in actual sending or receiving data is different among wavelengths in communications of the ONUs 20.

In the network system shown in FIG. 1, it is assumed that each value for N1, N2, N3, and N4 is 16. Furthermore, it is assumed that the ONU 20-1-1 to 20-1-16, and the ONU 20-2-1 to 20-2-16 are installed at long distant places from the OLT 10 so that they need to apply the FEC to their communications, but the ONU 20-3-1 to 20-3-16, and the ONU 20-4-1 to 20-4-16 are installed at short distant places from the OLT 10 so that they do not need to apply the FEC to their communications.

The number of ONUs 20 that communicate at each of the aforementioned wavelengths (combinations of a downstream wavelength $\lambda D1$, $\lambda D2$, $\lambda D3$, or $\lambda D4$ and an upstream wavelength $\lambda U1$, $\lambda U2$, $\lambda U3$, or $\lambda U4$) is 16. In these situations, whether to apply the FEC causes difference in the bandwidth available for communications of each ONU 20.

An example is studied in which the transmission rate is 10 Gbps and the Reed-Solomon (255,223) code is employed for the FEC. An average effective bandwidth per each ONU 20 for the ONUs 20-1-1 to 20-1-16 and the ONUs 20-2-1 to 20-2-16 is 10 Gbps*(223/255)*1/16=547 Mbps. On the other hand, an average effective bandwidth per ONU 20 for the ONUs 20-3-1 to 20-3-16 and the ONUs 20-4-1 to 20-4-16 is 10 Gbps*1*1/16=625 Mbps. As a result, the average effective bandwidth for the ONUs 20 employing the FEC is lower than the average effective bandwidth for the ONUs 20 without employing the FEC.

In this way, if a WDM/TDM-PON system includes ONUs 20 different in FEC code rate, the TDM-PON system therein includes ONUs 20 different in effective transmission rate in transmission and receiving by an ONU 20. Embodiment 1 can eliminate unfairness in communication bandwidth among the wavelengths caused by the co-existence of ONUs 20 employing the FEC code rate and ONUs 20 without employing it in a network system.

Figure 2:
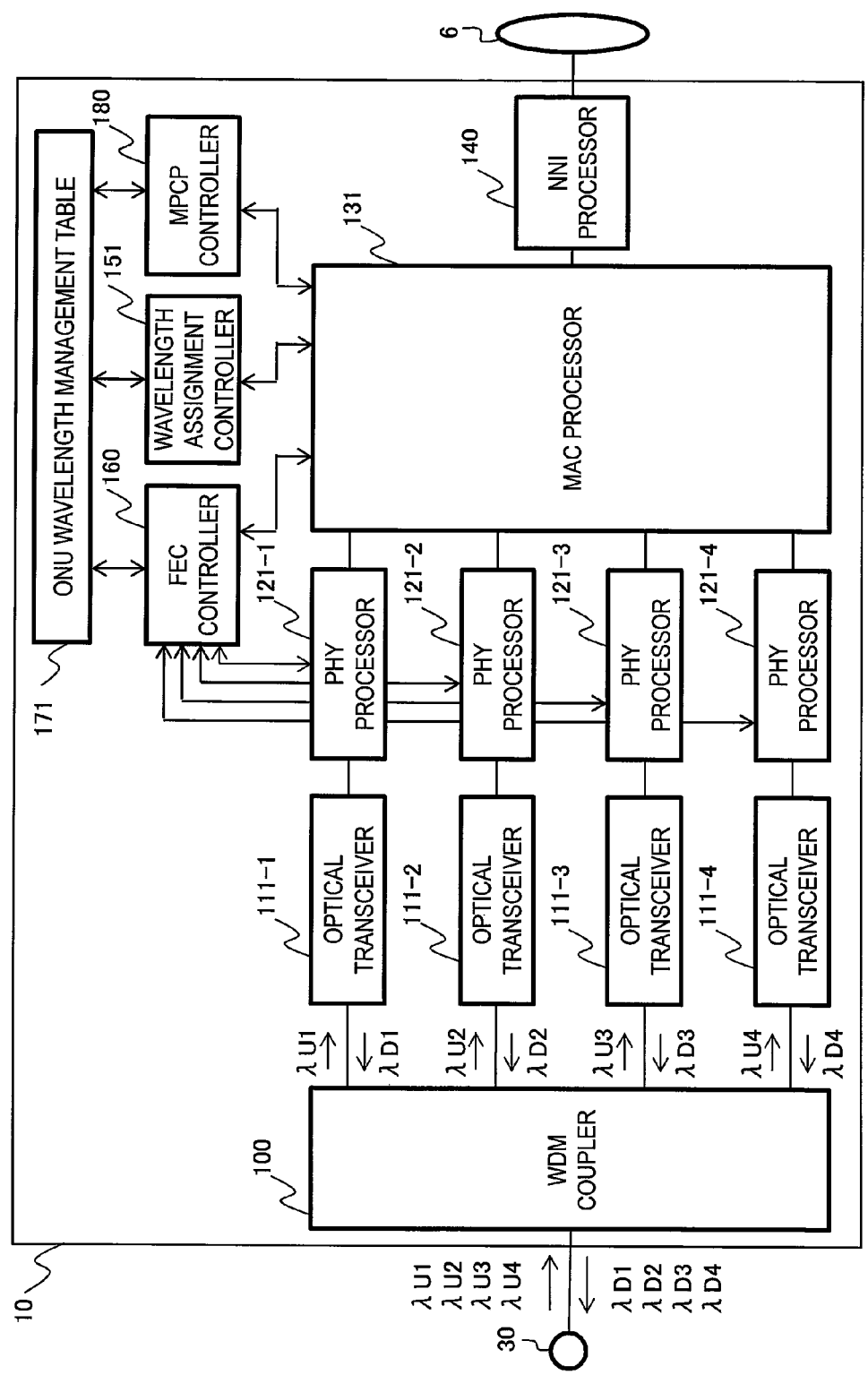
FIG. 2 is a block diagram illustrating a configuration of an OLT in Embodiment 1.

FIG. 2 is a block diagram illustrating a configuration of the OLT 10 in Embodiment 1.

The OLT 10 includes a WDM coupler (Wavelength Division Multiplexing coupler) 100, optical transceivers 111 (111-1 to 111-4), PHY processors 121 (121-1 to 121-4), a MAC processor 131, an NNI processor 140, a wavelength assignment controller 151, an FEC controller 160, an ONU wavelength management table 171, and an MPCP controller 180. For example, the communication interface of the OLT 10 may include the WDM coupler 100, the optical transceivers 111, and the PHY processors 121. The functions of these devices and processors are described below.

The WDM coupler 100 multiplexes and demultiplexes upstream optical signals including upstream wavelengths $\lambda U1$ to $\lambda U4$ and multiplexes and demultiplexes downstream optical signals including downstream wavelengths $\lambda D1$ to $\lambda D4$. The WDM coupler 100 demultiplexes a multiplex upstream optical signal including upstream wavelengths of $\lambda U1$ to $\lambda U4$ fed to the OLT 10. Then, the WDM coupler 100 feeds the upstream optical signal having the upstream wavelength $\lambda U1$ to the optical transceiver 111-1, the upstream optical signal having the upstream wavelength $\lambda U2$ to the optical transceiver 111-2, the upstream optical signal having the upstream wavelength $\lambda U3$ to the optical transceiver 111-3, and the upstream optical signal having the upstream wavelength $\lambda U4$ to the optical transceiver 111-4.

The WDM coupler 100 also multiplexes a downstream optical signal having a downstream wavelength $\lambda D1$ fed from the optical transceiver 111-1, a downstream optical signal having a downstream wavelength 102 fed from the optical transceiver 111-2, a downstream optical signal having a downstream wavelength $\lambda D3$ fed from the optical transceiver 111-3, and a downstream optical signal having a downstream wavelength of $\lambda D4$ fed from the optical transceiver 111-4. Then, it feeds the multiplex downstream optical signal to the optical fiber 40-0.

The optical transceivers 111-1 to 111-4 receive upstream optical signals having upstream wavelengths $\lambda U1$ to $\lambda U4$ fed by the WDM coupler 100 and convert the received upstream optical signals into electric current signals. Furthermore, each optical transceiver 111 converts the obtained current signal into a voltage signal, amplifies it, and feeds it to each PHY processor 121.

The optical transceivers 111-1 to 111-4 also convert electric signals fed by the PHY processors 121-1 to 121-4 into optical signals having the downstream wavelengths $\lambda D1$ to $\lambda D4$ and feed the obtained optical signals to the WDM coupler 100.

The PHY processors 121-1 to 121-4 extracts clocks from electric signals fed by the optical transceivers 111-1 to 111-4, retime the electric signals with the extracted clocks, and convert the electric signals to digital signals. Each PHY processor 121 performs decoding on the digital signal, and further performs FEC decoding on the digital signal as necessary. Each PHY processor 121 extracts a frame from the digital signal and feeds the extracted frame to the MAC processor 131.

Each PHY processor 121 also encodes a frame fed by the MAC processor 131 and performs FEC encoding as necessary. The PHY processor 121 converts a coded frame into an electric signal waveform based on a clock held by the OLT 10 to generate an electric signal. The PHY processor 121 feeds the generated electric signal to one of the optical transceivers 111-1 to 111-4.

It should be noted that each PHY processor 121 can hold an ON/OFF value indicating whether to perform FEC decoding and FEC encoding for each ONU 20 in connection and switch the value between ON and OFF in accordance with an instruction from the FEC controller 160.

For example, if the network system employs the FEC code type of Reed-Solomon (255,223) and a PHY processor 121 holds a value indicating FEC ON for the ONU 20-1-1, the PHY processor 121 attaches a parity bit string to a frame to be sent to the ONU 20-1-1. If the PHY processor 121 holds a value indicating FEC OFF for the ONU 20-1-1, it does not attach a parity bit to a frame to be sent to the ONU 20-1-1. Through these operations, the PHY processor 121 can switch whether to perform FEC encoding.

If a PHY processor 121 holds a value indicating FEC ON for the ONU 20-1-1, it performs decoding using a parity bit string in a frame sent from the ONU 20-1-1. If the PHY processor 121 holds a value indicating FEC OFF for the ONU 20-1-1, it performs decoding without using a parity bit string in a frame sent from the ONU 20-1-1. Through these operations, the PHY processor 121 can switch whether to perform FEC decoding.

The MAC processor 131 analyzes header information in frames received from the PHY processors 121-1 to 121-4 to identify whether each frame is a user data frame or a control frame. The MAC processor 131 aggregates user data frames sent from the PHY processors 121 to feed the aggregated user data frames to the NNI processor 140.

The MAC processor 131 further identifies the type of a control frame and feeds it to the wavelength assignment controller 151 or the MPCP controller 180 depending on the type of the control frame. The types of the control frames include wavelength assignment control frame such as the later-described λSET_ACK frame and MPCP control frame. If the received frame is of a type relating to wavelength assignment, the MAC processor 131 feeds the frame to the wavelength assignment controller 151.

The MAC processor 131 also distributes user data frames received from the NNI processor 140, wavelength assignment control frames (λSET frames) received from the wavelength assignment controller 151, and MPCP control frames received from the MPCP controller 180 to the PHY processors 121-1 to 121-4 in accordance with the destination address included in the frame. The MAC processor 131 multiplexes the user data frames and control frames by destination address and feeds the obtained multiplex frames to the PHY processors 121-1 to 121-4.

The NNI processor 140 converts user data frames received from the MAC processor 131 into signals conformable to the NNI (Network Node Interface) and feeds the converted user data frames to the network 6. The NNI processor 140 also transfers user data frames fed from the network 6 to the MAC processor 131.

The wavelength assignment controller 151 determines the wavelength to be used in transmission or receiving by ONUs 20 based on the ONU wavelength management table 171. Furthermore, the wavelength assignment controller 151 creates a wavelength assignment control frame (λSET frame) for setting the determined wavelength to an ONU 20 or terminates a wavelength assignment control frame (λSET_ACK frame). The format of the wavelength assignment control frame will be described later.

The FEC controller 160 creates and terminates a control frame to specify the FEC ON/OFF for each ONU 20 in each PHY processor 121.

The ONU wavelength management table 171 holds ONU identifiers, FEC code rates for the ONUs 20, and identifiers of wavelengths in transmission and receiving. A specific example of this table will be described later.

The MPCP controller 180 creates a GATE frame for specifying the period for an ONU 20 to send upstream optical signals and terminates a REPORT frame for requesting a required bandwidth by an ONU 20. The MPCP controller 180 also creates and terminates an MPCP control frame such as a DiscoveryGATE or a REGISTER for registering a newly connected ONU 20.

In the configuration of the OLT 10 shown in FIG. 2, one MPCP controller 180 performs MPCP control for four wavelengths; however, the OLT 10 may have a plurality of MPCP controllers which individually perform MPCP control for a specific wavelength.

The OLT 10 as configured in Embodiment 1 can send and receive optical signals having different FEC code rates depending on the ONU 20, calculate transmission and receiving wavelengths for individual ONUs 20 based on the different FEC code rates of the ONUs 20. The OLT 10 can further send and receive control frames for setting the wavelengths to the individual ONUs 20.

Figures 3, 4:
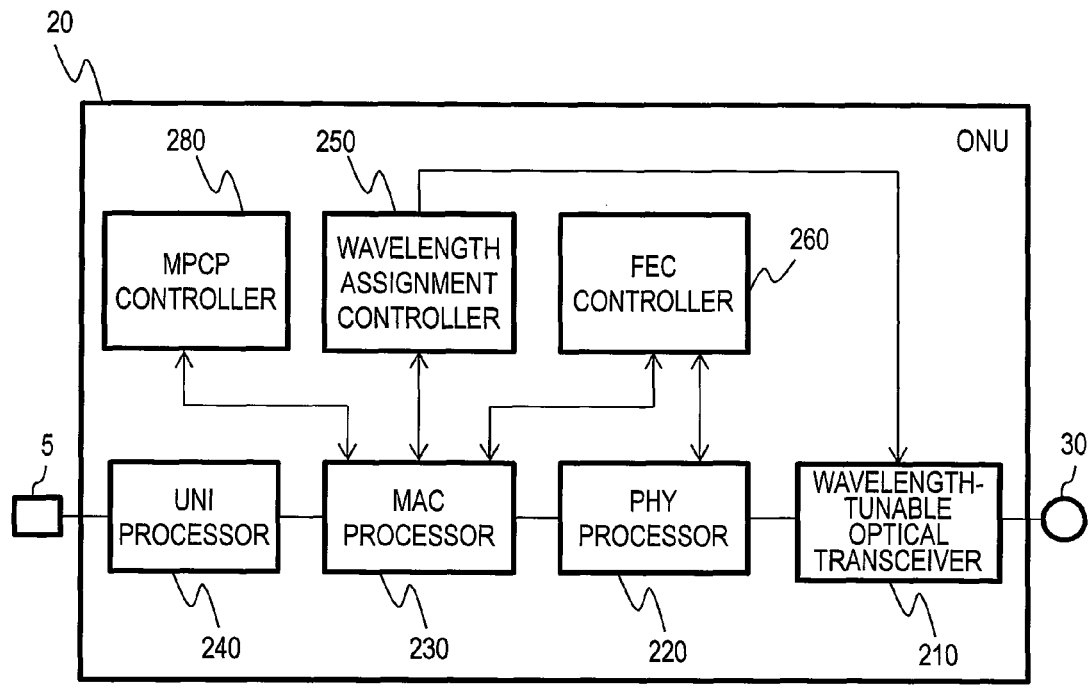
FIG. 3 is a block diagram illustrating a configuration of an ONU in Embodiment 1.
FIG. 4 is an explanatory diagram illustrating an ONU wavelength management table in Embodiment 1.

FIG. 3 is a block diagram illustrating a configuration of an ONU 20 in Embodiment 1.

The ONU 20 includes a wavelength-tunable optical transceiver 210, a PHY processor 220, a MAC processor 230, a UNI processor 240, a wavelength assignment controller 250, an FEC controller 260, and an MPCP controller 280. The functions of these devices and processors are described below.

The wavelength-tunable optical transceiver 210 is an optical transceiver that can tune the transmission wavelength and the receiving wavelength. The wavelength-tunable optical transceiver 210 receives an instruction to set a transmission wavelength and a receiving wavelength from the wavelength assignment controller 250. The wavelength-tunable optical transceiver 210 sets the transmission wavelength for received upstream optical signals at one of the upstream wavelengths $\lambda U1$ to $\lambda U4$ in accordance with the instruction and sends upstream signals toward the OLT 10. The wavelength-tunable optical transceiver 210 receives downstream optical signals to which the receiving wavelength has been set at one of the downstream wavelengths $\lambda D1$ to $\lambda D4$.

Now, operations of the wavelength-tunable optical transceiver 210 are described, assuming that the transmission wavelength is set at the upstream wavelength $\lambda U1$ and the receiving wavelength is set at the downstream wavelength $\lambda D1$. When the wavelength-tunable optical transceiver 210 receives a downstream optical signal which is obtained by wavelength-division multiplexing downstream wavelengths $\lambda D1$ to $\lambda D4$ and sent from the OLT 10, it cuts off the wavelengths other than the downstream wavelength $\lambda D1$. Through this operation, the wavelength-tunable optical transceiver 210 selects only the downstream optical signal having the downstream wavelength $\lambda D1$ to receive the selected downstream optical signal. The wavelength-tunable optical transceiver 210 may include an optical filter that can tune the wavelength to pass through to perform such an operation.

The wavelength-tunable optical transceiver 210 converts the downstream optical signal having the downstream wavelength $\lambda D1$ into an electric current signal, converts the electric current signal into an voltage signal, and then amplifies the voltage signal to generate an electric signal. The wavelength-tunable optical transceiver 210 feeds the generated electric signal to the PHY processor 220. The wavelength-tunable optical transceiver 210 also converts an electric signal fed from the PHY processor 220 to an upstream optical signal having the upstream wavelength $\lambda U1$ and outputs the converted upstream optical signal toward the OLT 10.

The PHY processor 220 extracts a clock from an electric signal fed from the wavelength-tunable optical transceiver 210, retimes the electric signal with the extracted clock, and converts the electric signal into a digital signal. Furthermore, the PHY processor 220 performs decoding on the digital signal and performs FEC decoding as necessary to extract a frame from the digital signal. Then, the PHY processor 220 feeds the extracted frame to the MAC processor 230.

The PHY processor 220 also performs encoding on a frame fed from the MAC processor 230 and performs FEC encoding as necessary. The PHY processor 220 converts the received frame into an electric signal waveform based on a clock held in the ONU 20 to generate an electric signal, and feeds the generated electric signal to the wavelength-tunable optical transceiver 210.

It should be noted that the PHY processor 220 has a value ON/OFF indicating whether to perform the FEC decoding and FEC encoding and can switch the value ON/OFF in accordance with an instruction from the FEC controller 260.

For example, if the PHY processor 220 employs the FEC code type of Reed-Solomon (255,223) and holds a value indicating FEC ON, the PHY processor 220 attaches a parity bit string to an upstream optical signal in FEC encoding. If the PHY processor 220 holds a value indicating FEC OFF, it processes the signal without attaching a parity bit. Through these operations, the PHY processor 220 can switch whether to perform FEC encoding.

If the PHY processor 220 holds a value indicating FEC ON, it performs decoding using a parity bit string. If the PHY processor 220 holds a value indicating FEC OFF, it performs decoding without using a parity bit string. Through these operations, the FEC ON/OFF can be switched.

The MAC processor 230 analyzes header information in frames received from the PHY processor 220 to identify whether the frame is a user data frame or a control frame. The MAC processor 230 feeds user data frames to the UNI processor 240 and feeds control frames to the wavelength assignment controller 250 or the MPCP controller 280 after identifying the type of the control frame.

The MAC processor 230 also multiplexes user data frames received from the UNI processor 240, wavelength assignment control frames received from the wavelength assignment controller 250, and MPCP control frames received from the MPCP controller 280 and feeds the obtained multiplex frames to the PHY processor 220.

The UNI processor 240 converts user data frames received from the MAC processor 230 into signals conformable to the UNI (User Network Interface) and sends the obtained frames to the terminal 5. The UNI processor 240 also transfers user data frames sent from the terminal 5 to the MAC processor 230.

The wavelength assignment controller 250 performs control of changing the transmission wavelength and the receiving wavelength in the wavelength-tunable optical transceiver 210 based on the wavelength information included in a wavelength assignment control frame (λSET frame) and information on the time to change the wavelength received from the OLT 10. It also creates a wavelength assignment control frame (λSET_ACK frame) upon completion of the wavelength change in the wavelength-tunable optical transceiver 210. The wavelength assignment controller 250 feeds the created wavelength assignment control frame (λSET_ACK frame) to the MAC processor 230.

The FEC controller 260 creates and terminates control frames for specifying the FEC ON/OFF in the PHY processor 220. The FEC controller 260 also controls switching of the FEC ON/OFF in the PHY processor 220 based on the received control frame.

The MPCP controller 280 terminates GATE frames for specifying the period to send upstream optical signals and creates REPORT frames for requesting a required bandwidth. The MPCP controller 280 also creates and terminates MPCP control frames such as DiscoveryGATE and REGISTER for registering a newly connected ONU 20.

The ONU 20 as configured in this embodiment can send and receive optical signals at a selected FEC code rate, and also change the wavelength of optical signals to be sent and received by the ONU 20 based on wavelength assignment control frames received from the OLT 10.

FIG. 4 is an explanatory diagram illustrating the ONU wavelength management table 171 in Example 1.

The ONU wavelength management table 171 held in the OLT 10 in Example 1 is described. The ONU wavelength management table 171 includes ONU identifiers 1711, FEC code rates 1712, and wavelength identifiers 1713.

The ONU identifier 1711 is an identifier uniquely representing an ONU 20 and the FEC code rate 1712 is an FEC code rate used in communications with the ONU 20 represented by an ONU identifier 1711. The FEC code rate 1712 is a value obtained based on communications with the ONU 20 in later-described discovery process.

The wavelength identifier 1713 is an identifier uniquely representing a wavelength (a combination of a transmission wavelength and a receiving wavelength) assigned to the ONU 20 represented by an ONU identifier 1711. This embodiment employs a limited number of wavelengths to be used in communications between the OLT 10 and the ONUs 20; the wavelength identifier 1713 is also one of a predetermined limited number of kinds of identifiers.

The following description explains that the OLT 10 and the ONUs 20 use the FEC code type of Reed-Solomon (255,233) to switch application of the FEC by holding a value ON or OFF.

It is assumed that, in an ONU 20 having an ONU identifier 1711 of "1", the FEC application is OFF; the transmission wavelength is an upstream wavelength λU1; and the receiving wavelength is a downstream wavelength 201. In the entry having the ONU identifier 1711 of "1" in the ONU wavelength management table 171, the FEC code rate 1712 is "1" (1=255/255) and the wavelength identifier 1713 is "1".

It is also assumed that, in an ONU 20 having an ONU identifier 1711 of "2", the application of the FEC is ON; the transmission wavelength is an upstream wavelength λU4; and the receiving wavelength is a downstream wavelength λD4. In the entry having the ONU identifier 1711 of "2" in the ONU wavelength management table 171, the FEC code rate 1712 is "0.875" (0.875=223/255) and the wavelength identifier 1713 is "4".

The ONU identifier 1711 in FIG. 4 is one of the values of 1 to 256; however, it may be the MAC address or the serial number of the ONU 20, as far as the value can identify the ONU 20.

Figure 5:
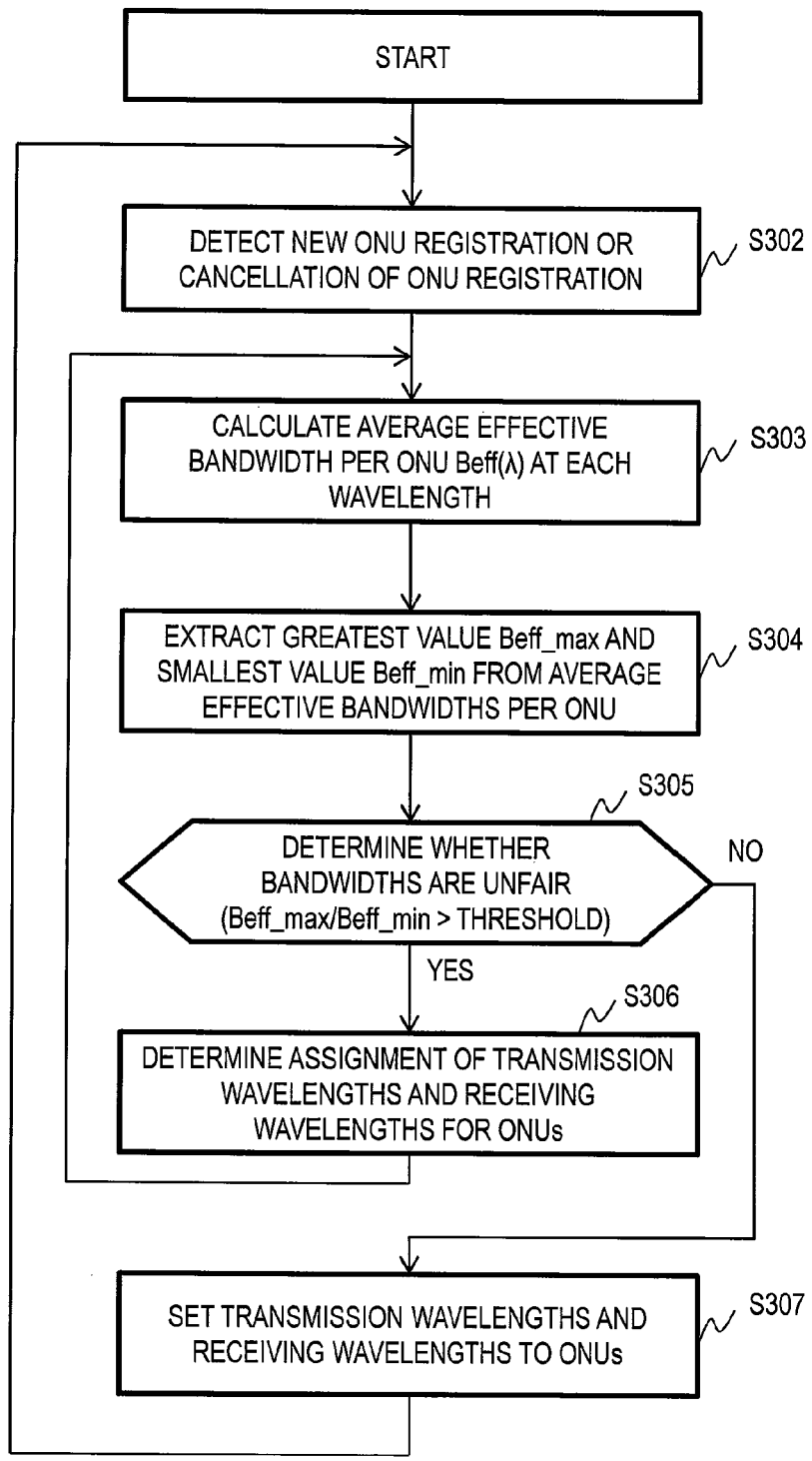
FIG. 5 is a flowchart illustrating overall processing by a wavelength assignment controller in the OLT in Embodiment 1.

FIG. 5 is a flowchart illustrating overall processing by the wavelength assignment controller 151 in the OLT 10 in Embodiment 1.

After start of the wavelength assignment control, the wavelength assignment controller 151 detects a change in the ONUs 20 connected to the OLT 10 by detecting registration of a new ONU 20 or cancellation of registration of an ONU 20 (S302).

Specifically, the wavelength assignment controller 151 determines that it has detected registration of a new ONU 20 at S302 when registration of the new ONU 20 has been detected and completed in a later-described discovery process. The wavelength assignment controller 151 also determines that registration of an ONU 20 has been canceled at S302 when an ONU 20 that had not sent a REPORT frame to the OLT 10 for a predetermined period has been detected and the registration of the ONU 20 has been canceled.

After S302, the wavelength assignment controller 151 calculates an average effective bandwidth per ONU 20 Beff(λ) at each wavelength (S303). The average effective bandwidth per ONU 20 Beff(λ) means an average bandwidth for one ONU 20 in the case where the ONUs 20 assigned the same wavelength fairly share the bandwidth. For example, the wave length assignment controller 151 may calculate the average effective bandwidth Beff(λ) with the following Formula 1:

$$Beff(\lambda) = \left\{ \sum_{i=1}^{N(\lambda)} \frac{1}{R(\lambda,i)} \right\}^{-1} \quad (1)$$

where, N(λ) represents the number of ONUs 20 that communicate at a wavelength λ and are registered in the OLT 10; the effective transmission rate R(λ,i) represents an effective transmission rate of an ONU 20 that communicates at the wavelength λ and has an ONU identifier 1711 of "i".

For example, if the ONU 20-1-1 has a transmission rate of 10 Gbps in the PON area and an FEC code rate 1712 of 0.875, the effective transmission rate R(λ,i) of the ONU 20-1-1 is 8.75 Gbps=10 Gbps*0.875. And, if the ONU 20-1-2 has a transmission rate of 10 Gbps in the PON area and an FEC code rate 1712 of 1, the effective transmission rate R(λ,i) of the ONU 20-1-2 is 10 Gbps=10 Gbps*1.

When these two ONUs 20 sends and receives signals at a wavelength λ1 (a combination of an upstream wavelength λU1 and a downstream wavelength λD1), the wavelength assignment controller 151 calculates an average effective bandwidth per ONU 20 Beff(λ1) at the wavelength λ1 by Formula 1 as follows:

Beff(λ1)=1/(1/8.75 Gbps+1/10 Gbps)=4.67 Gbps

The wavelength assignment controller 151 obtains FEC code rates 1712 for the ONUs 20 which communicate at each wavelength from the ONU wavelength management table 171 and calculates the average effective bandwidth per ONU 20 Beff(λ) at each wavelength based on the Formula 1.

It should be noted that the transmission rates of all the ONUs 20 are the same in Embodiment 1; accordingly, the wavelength assignment controller 151 does not need to use the transmission rates of the ONUs 20 to calculate the aforementioned effective transmission rate R(λ,i). Specifically, the wavelength assignment controller 151 may obtain the value of the FEC code rate 1712 for the effective transmission rate R(λ,i) to calculate the average effective bandwidth Beff(λ). If the wavelength assignment controller 151 has been instructed that the transmission rate does not need to be considered, it does not need to use the transmission rates of the ONUs 20 to calculate the effective transmission rate R(λ,i), either.

After S303, the wavelength assignment controller 151 extracts the greatest value Beff_max and the smallest value Beff_min from all of the average effective bandwidths Beff (λ) at individual wavelengths λ calculated at S303 (S304).

After S304, the wavelength assignment controller 151 determines whether the average effective bandwidth Beff(λ) is unfair among the wavelengths λ, based on the greatest value Beff_max and the smallest value Beff_min (S305). Specifically, the wavelength assignment controller 151 obtains an evaluation value (Beff_max/Beff_min), which is a result of dividing the greatest value Beff_max by the smallest value Beff_min, and compares the evaluation value (Beff_max/Beff_min) with a predetermined certain range.

As a result of the comparison, if the evaluation value (Beff_max/Beff_min) is out of the predetermined range, the wavelength assignment controller 151 determines that the bandwidth is unfair among the wavelengths and performs 5306. If the evaluation value (Beff_max/Beff_min) is within the predetermined range, the wavelength assignment controller 151 determines that the bandwidth is fair among the wavelengths and performs S307.

In the above description, the evaluation value (Beff_max/Beff_min) is a result of a division, but the wavelength assignment controller 151 may obtain an evaluation value (Beff_max−Beff_min) by subtracting the smallest value Beff_min from the greatest value Beff_max. And at S305, the wavelength assignment controller 151 may determine that the bandwidth is unfair among the wavelengths λ, if the evaluation value (Beff_max−Beff_min) is greater than a predetermined threshold.

At S306, the wavelength assignment controller 151 determines assignment of wavelengths used in transmission and receiving by the ONUs 20 to eliminate the unfairness in bandwidth among the wavelengths based on the FEC code rates 1712 of the individual ONUs 20. After determining the wavelength assignment, the wavelength assignment controller 151 returns to S303.

Then, the wavelength assignment controller 151 performs 5303 and S304 with the wavelengths in accordance with the determined assignment. If, at S305, the wavelength assignment controller 151 determines that the unfairness in bandwidth among the wavelengths has been eliminated, it performs S307.

At S307, the wavelength assignment controller 151 sends a wavelength assignment control frame (λSET frame) for setting a wavelength to each ONU 20 based on the wavelength determined at 5306. Thereafter, when each ONU 20 completes the wavelength change and the wavelength assignment controller 151 receives a wavelength assignment control frame (λSET_ACK frame) sent from each ONU 20, the wavelength assignment controller 151 registers a wavelength identifier 1713 indicating the wavelength after change in the wavelength identifier 1713 in the ONU wavelength management table 171 for each ONU 20 (S307).

Through the processing shown in FIG. 5, the wavelength assignment controller 151 determines assignment of wavelengths for the ONUs 20 to use in transmission and receiving based on the FEC code rates 1712 of the ONUs 20 so as to eliminate the unfairness in the average effective bandwidth per ONU 20 Beff(λ) and sets wavelengths to the ONUs 20 based on the determined wavelengths at which the unfairness can be eliminated.

Now, some specific methods of assigning wavelengths at 5306 are provided.

The first method of assigning wavelengths is that the wavelength assignment controller 151 calculates an evaluation value (Beff_max/Beff_min) indicating the unfairness for every potential combination of wavelengths which might be assigned to the ONUs 20 based on the FEC code rate 1712. The wavelength assignment controller 151 extracts a combination of wavelengths with which the evaluation value (Beff_max/Beff_min) is smallest from all of the potential combinations and determines the extracted combination of wavelengths to be assigned to the ONUs 20.

When employing the first method of assigning wavelengths, the wavelength assignment controller 151 can determine the assignment of wavelengths that results in the smallest unfairness evaluation value.

The second method of assigning wavelengths is that the wavelength assignment controller 151 determines the wavelengths to be assigned to the ONUs 20 so that the number of ONUs 20 having the same FEC code rate will be as fair as possible among the wavelengths.

The following description provides an example of a four-wavelength multiplex WDM/TDM-PON system which includes only two groups of ONUs 20, one having an FEC code rate 1712 of "1" and the other having an FEC code rate 1712 of "0.875". It is assumed that the group of the FEC code rate 1712 of "1" consists of 32 ONUs 20 and the group of the FEC code rate 1712 of "0.875" consists of 16 ONUs 20, namely, a total of 48 ONUs 20 are registered in an OLT 10.

In this case, the wavelength assignment controller 151 divides the ONUs 20 having the FEC code rate 1712 of "1" into four groups of eight ONUs (because there are four wavelengths) by the second method and assigns the four groups to different wavelengths. The wavelength assignment controller 151 divides the ONUs 20 having the FEC code rate 1712 of "0.875" into four groups of four ONUs and assigns the four groups to different wavelengths.

Through these operations, the number of ONUs 20 having the FEC code rate 1712 of "1" becomes fair among the wavelengths and the number of ONUs 20 having the FEC code rate 1712 of "0.875" becomes fair among the wavelengths. As a result, the average effective bandwidths per ONU 20 will be fair in all the wavelengths; accordingly, the wavelength assignment controller 151 attains the fairness among the wavelengths.

The third method of assigning wavelengths is that the wavelength assignment controller 151 assigns an ONU 20 newly registered in the OLT 10 the wavelength at which the average effective bandwidth has been broadest until the registration of the new ONU 20. Since the average effective bandwidth at the wavelength assigned to the new ONU 20 is narrowed by the registration of the new ONU 20, this method can reduce the unfairness in bandwidth.

The second and the third methods of assigning wavelengths can speed up the processing of the wavelength assignment controller 151 particularly in a system including a greater number of ONUs 20.

The wavelength assignment controller 151 in Embodiment 1 may omit S302 to S305 in FIG. 5 to perform only S306 and S307. For example, in the case of receipt of an instruction from the administrator or operator, the wavelength assignment controller 151 may perform only S306 and S307.

In the case of employing the second or the third method and performing only S306 and S307, the wavelength assignment controller 151 can determine the wavelength assignment based on the FEC code rate 1712 only.

Wavelength assignment at new registration of an ONU 20 in Embodiment 1 is described.

Figure 6:
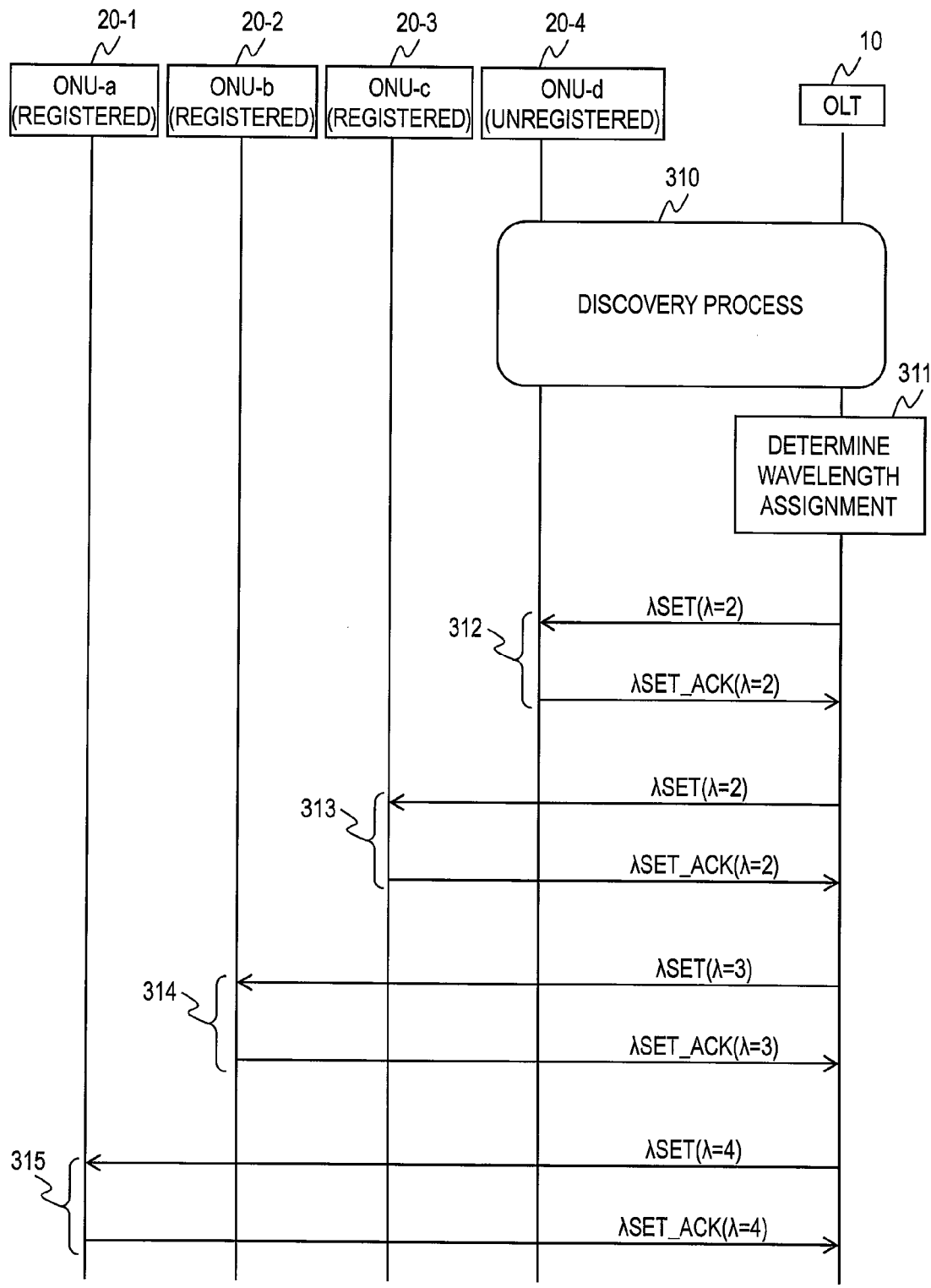
FIG. 6 is a sequence diagram illustrating operations in wavelength assignment between the OLT and ONUs at registration of an ONU in Embodiment 1.

FIG. 6 is a sequence diagram illustrating operations in wavelength assignment between the OLT 10 and the ONUs 20 at registration of an ONU 20-4 in Embodiment 1.

For simpler explanation, the following example is described assuming that three ONUs, an ONU 20-1, an ONU 20-2, and an ONU 20-3, have already been registered in an OLT 10 and an ONU 20-4 is newly registered. Although the ONUs 20 actually connected to the OLT 10 include other ONUs than the ONUs 20-1, 20-2, 20-3, and 20-4, FIG. 6 explains operations between the OLT 10 and the ONUs 20-1, 20-2, 20-3, and 20-4, which change the wavelengths as a result of determination of wavelengths by the OLT 10.

First, the ONU 20-4 is newly connected, turned on, and activated. In this embodiment, an ONU 20 communicates with the OLT 1 at a wavelength λ1 (a combination of an upstream wavelength λU1 and a downstream wavelength λD1, namely the wavelength identifier 1713 of "1") until receipt of a λSET frame. At the start of the sequence of FIG. 6, the ONU 20-1 is assigned a wavelength λ1 having a wavelength identifier 1713 of "1"; the ONU 20-2 is assigned a wavelength λ2 having a wavelength identifier 1713 of "2" (an upstream wavelength λU2 and a downstream wavelength λD2); and the ONU 20-3 is assigned a wavelength λ3 having a wavelength identifier 1713 of "3" (an upstream wavelength λU3 and a downstream wavelength λD3).

The OLT 10 periodically performs a discovery process at each wavelength. For this reason, in a discovery process 310 at the wavelength λ1 after the startup of the ONU 20-4, the OLT 10 exchanges MPCP control frames and FEC control frames with the ONU 20-4. Through this operation, the OLT 10 measures a round trip time to the ONU 20-4 or sets initial parameters of the ONU 20-4 to the OLT 10.

In the discovery process 310, the wavelength assignment controller 151 in the OLT 10 acquires an FEC code rate 1712 to be applied to the ONU 20-4.

Specifically in the discovery process 310, the wavelength assignment controller 151 in the OLT 10 measures communications conditions between the ONU 20-4 and the OLT 10 and acquires an FEC code rate for the ONU 20-4 determined based on the result of the measurement as the FEC code rate 1712.

For example, if a value of the round trip time between the ONU 20-4 and the OLT 10 calculated by the MPCP controller 180 is longer than a predetermined threshold, the MPCP controller 180 determines the FEC code rate at the value ON. The wavelength assignment controller 151 acquires the determined FEC code rate as the FEC code rate 1712.

Upon acquisition of the FEC code rate 1712 for the ONU 20-4, the wavelength assignment controller 151 adds a new entry to the ONU wavelength management table 171. The wavelength assignment controller 151 stores an identifier indicating the ONU 20-4 to the ONU identifier 1711 in the new entry and stores the FEC code rate 1712 for the ONU 20-4 to the FEC code rate 1712 in the new entry in the ONU wavelength management table 171. The wavelength assignment controller 151 also stores an identifier indicating the wavelength λ1, which is a default for the transmission and receiving wavelengths, to the wavelength identifier 1713 in the new entry.

After the foregoing operations, the OLT 10 terminates the registration of the ONU 20-4 by the discovery process 310.

After the registration of the ONU 20-4, the wavelength assignment controller 151 in the OLT 10 determines the wavelengths to be assigned to the ONUs 20 so that the average effective bandwidth Beff(λ) will be fair among the wavelengths with reference to the ONU wavelength management table 171 (311). The operations at the step 311 correspond to S302 to S306 shown in FIG. 5.

In FIG. 6, the wavelengths for four ONUs 20, the ONU 20-1, ONU 20-2, ONU 20-3, and ONU 20-4, are changed. At the step 311 in FIG. 6, the wavelength assignment controller 151 determines to assign the ONU 20-1 the wavelength λ4 (the upstream wavelength λU4 and the downstream wavelength 104) having the wavelength identifier 1713 of "4", the ONU 20-2 the wavelength λ3 having the wavelength identifier 1713 of "3", the ONU 20-3 the wavelength λ2 having the wavelength identifier 1713 of "2", and the ONU 20-4 the wavelength λ2 having the wavelength identifier 1713 of "2".

After the determination of the wavelength assignment, the OLT 10 sets the wavelengths to the ONUs 20 which are determined to change the wavelength (312 to 315). The steps 312 to 315 correspond to S307 in FIG. 5.

In the example shown in FIG. 6, the OLT 10 sets the wavelengths to the ONU 20-4, ONU 20-3, ONU 20-2, and ONU 20-1 in this order.

At the step 312, the OLT 10 sends a λSET (wavelength λ2) frame, which is a control frame for setting the assigned wavelength λ2 to an ONU 20, to the ONU 20-4. The wavelength-tunable optical transceiver 210 in the ONU 20-4 sets the transmission wavelength at an upstream wavelength λU2 and the receiving wavelength at a downstream wavelength λD2.

After completion of the setting, the ONU 20-4 sends a λSET_ACK (wavelength λ2) frame to the OLT 10 during the period specified by the λSET frame. The λSET_ACK frame is a control frame to notify the OLT 10 that the wavelength has properly been set.

At the step 313, the OLT 10 sends a λSET (wavelength λ2) frame to set the wavelength λ2 to the ONU 20-3. The wavelength-tunable optical transceiver 210 in the ONU 20-3 sets the transmission wavelength at the upstream wavelength λU2 and the receiving wavelength at the downstream wavelength λD2. After completion of the setting, the ONU 20-3 sends a λSET_ACK (wavelength λ2) frame to the OLT 10 during the period specified by the λSET frame.

At the step 314, the OLT 10 sends a λSET (wavelength λ3) frame to set the wavelength λ3 to the ONU 20-2. The wavelength-tunable optical transceiver 210 in the ONU 20-2 sets the transmission wavelength at an upstream wavelength λU3 and the receiving wavelength at a downstream wavelength λD3. After completion of the setting, the ONU 20-2 sends a λSET_ACK (wavelength λ3) frame to the OLT 10 during the period specified by the λSET frame.

At the step 315, the OLT 10 sends a λSET (wavelength λ4) frame to set the wavelength λ1 to the ONU 20-1. The wavelength-tunable optical transceiver 210 in the ONU 20-1 sets the transmission wavelength at an upstream wavelength λU4 and the receiving wavelength at a downstream wavelength λD4. After completion of the setting, the ONU 20-1 sends a λSET_ACK (wavelength λ4) frame to the OLT 10 during the period specified by the λSET frame.

Through the foregoing operations, upon registration of a new ONU 20, the OLT 10 can determine wavelength assignment to achieve fair bandwidths among the wavelengths and set transmission and receiving wavelengths to the ONUs 20. Although this description provides a procedure of setting transmission and receiving wavelengths to each ONU 20, the transmission and receiving wavelengths may be set to a plurality of ONUs 20 collectively.

FIG. 6 shows a procedure in which the wavelengths are set after the discovery process 310; however, the steps 311 to 315 are performed after cancellation of registration of an ONU 20 is detected.

Now, frame formats of a λSET frame and a λSET_ACK are described. The λSET frame is for the OLT 10 to instruct an ONU 20 to set an assigned wavelength and the λSET_ACK frame is for an ONU 20 to notify the OLT 10 of completion of the wavelength setting.

The λSET frame and λSET_ACK frame in Embodiment 1 are control frames similar to the REPORT frame and the GATE frame, which are MPCP control frames. The λSET frame employs configurations specified in IEEE 802.3av Clause 77.3.6 for its fields.

Figure 7:
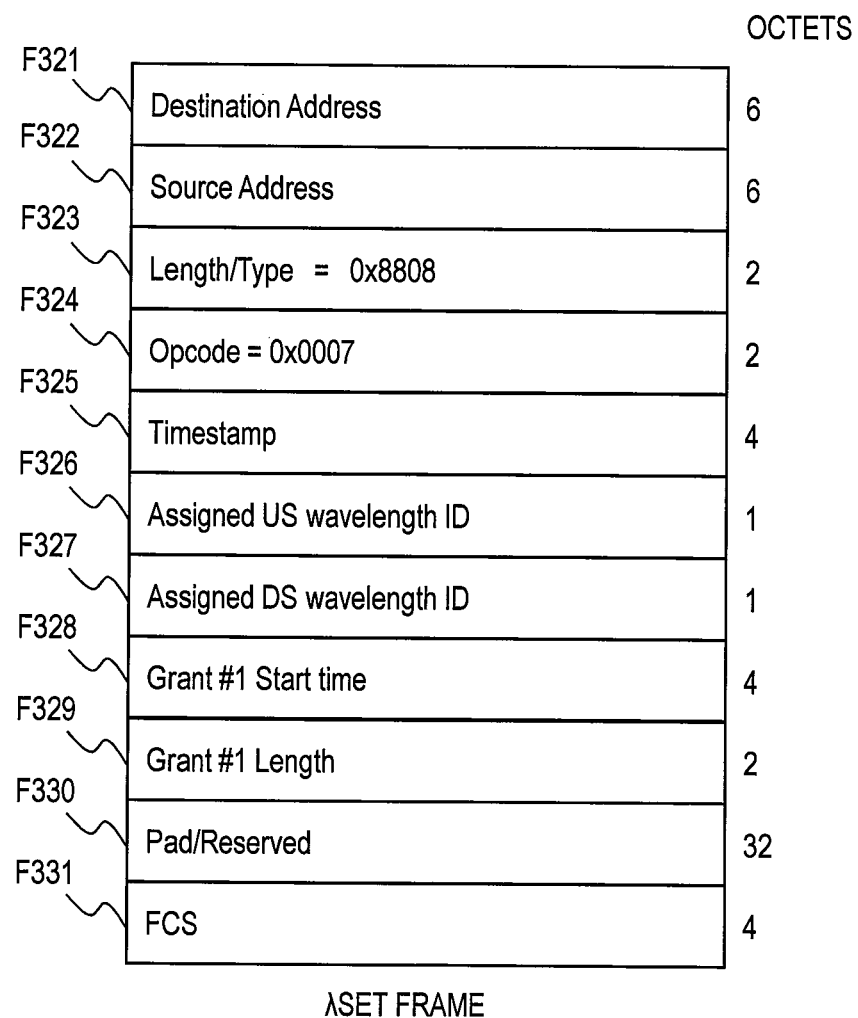
FIG. 7 is an explanatory diagram illustrating a λSET frame for setting wavelengths to an ONU in Embodiment 1.

FIG. 7 is an explanatory diagram illustrating a λSET frame in Embodiment 1 for setting a wavelength to an ONU 20.

First, the λSET frame is described. The λSET frame includes fields of Destination Address (F321), Source Address (F322), Length/Type (F323), Opcode (F324), Timestamp (F325), Assigned US wavelength ID (F326), Assigned DS wavelength ID (F327), Grant #1 Start time (F328), Grant #1 Length (F329), Pad/Reserved (F330), and FCS (F331).

The Destination Address (F321) indicates the destination address. The Source Address (F322) indicates the source address. The Length/Type (F323) indicates the length and the type of the frame. The Opcode (F324) indicates the type of the control frame. The Timestamp (F325) indicates the time of sending the control frame. The Assigned US wavelength ID (F326) indicates the identifier of the assigned upstream wavelength. The Assigned DS wavelength ID (F327) indicates the identifier of the assigned downstream wavelength. The Grant #1 Start time (F328) indicates the start time of the permitted period for upstream transmission. The Grant #1 Length (F329) indicates the length of the permitted period for upstream transmission. The Pad/Reserved (F330) is a field used as a padding or reserve. The FCS (F331) is a bit string to check whether the received frame contains an error. Hereinbelow, each field is described in detail.

In the Length/Type (F323) and the Opcode (F324), values for identifying the frame as a λSET frame, an MPCP control frame, or a user data frame are stored and they are used for the OLT 10 and the ONU 20 to transfer the frame depending on its type. For example, when sending a λSET frame, the OLT 10 stores "0x8808" in the Length/Type (F323) and "0x0007" in the Opcode (F324).

In the Assigned US wavelength ID (F326), the identifier of an upstream wavelength λU for the ONU 20 determined by the wavelength assignment controller 151 in the OLT 10 is stored. For example, if an upstream wavelength λU1 has been assigned, a value "0x01" indicating the upstream wavelength λU1 is stored in the Assigned US wavelength ID (F326) in the λSET frame to be sent to the ONU 20.

In the Assigned DS wavelength ID (F327), the identifier of a downstream wavelength λD for the ONU 20 determined by the wavelength assignment controller 151 in the OLT 10 is stored. For example, if a downstream wavelength λD1 has been assigned, a value "0x01" indicating the downstream wavelength λD1 is stored in the Assigned DS wavelength ID (F327) in the λSET frame to be sent to the ONU 20.

In the Grant #1 Start time (F328) and the Grant #1 Length (F329), information indicating a transmission period for the ONU 20 to send a λSET_ACK frame in response to the λSET frame is stored. Values to be stored in the Grant #1 Start time (F328) and the Grant #1 Length (F329) are determined by the OLT 10, in consideration of the time required for receiving an instruction by the λSET frame and setting the wavelength to the wavelength-tunable optical transceiver 210 and the periods allocated to the upstream bandwidths for the other ONUs 20 assigned the same wavelength as the ONU 20 that has received the λSET frame.

It should be noted that the frame format shown in FIG. 7 is a format that allows separate settings of an upstream wavelength and a downstream wavelength; however, if the same value is always set to the upstream wavelength and the downstream wavelength, the λSET frame in this embodiment may have a field for storing a single wavelength identifier.

Figure 8:
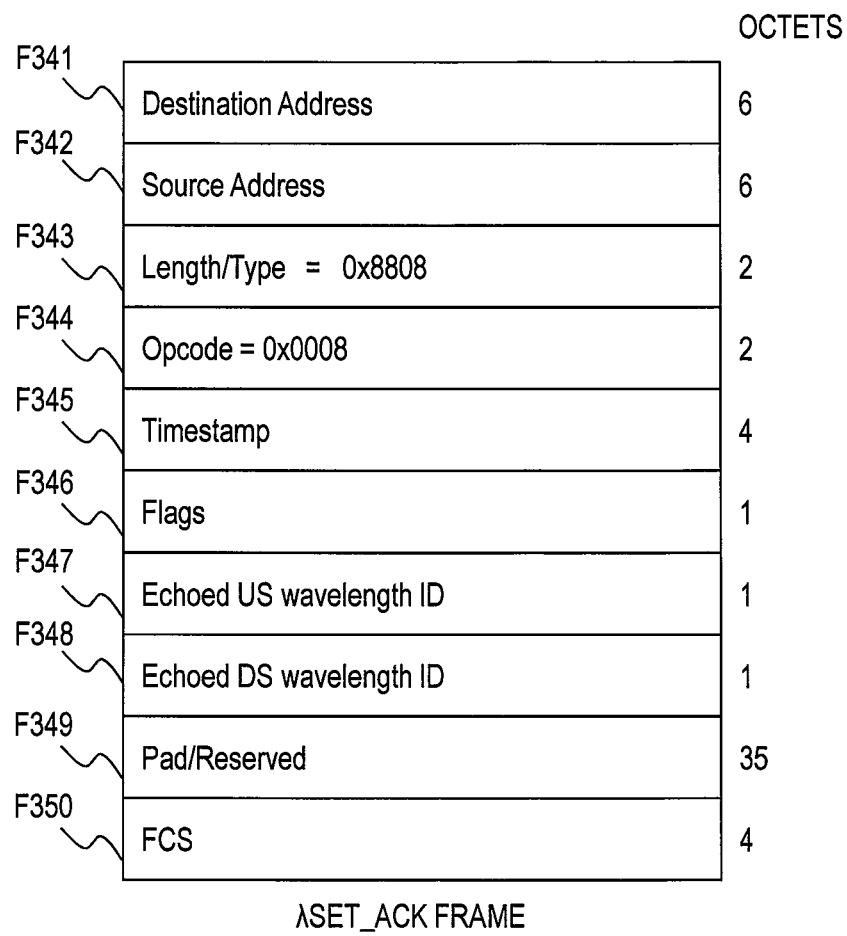
FIG. 8 is an explanatory diagram illustrating a λSET_ACK frame for responding to the λSET frame in Embodiment 1.

FIG. 8 is an explanatory diagram illustrating a λSET_ACK frame in Embodiment 1 for responding to a λSET frame.

The λSET_ACK frame is described. The λSET_ACK frame includes fields of Destination Address (F341), Source Address (F342), Length/Type (F343), Opcode (F344), Timestamp (F345), Flags (F346), Echoed US wavelength ID (F347), Echoed DS wavelength ID (F348), Pad/Reserved (F349), and FCS (F350).

The Destination Address (F341) indicates the destination address. The Source Address (F342) indicates the source address. The Length/Type (F343) indicates the length and the type of the frame. The Opcode (F344) indicates the type of the control frame. The Timestamp (F325) indicates the time of sending the control frame. The Flags (F346) indicates the response to the λSET frame. The Echoed US wavelength ID (F347) indicates the identifier of the assigned upstream wavelength. The Echoed DS wavelength ID (F348) indicates the identifier of the assigned downstream wavelength. The Pad/

Reserved (F349) is a field used as a padding or reserve. The FCS (F350) is a bit string to check whether the received frame contains an error.

Hereinbelow, each field is described in detail. As to the fields the same descriptions in the λSET frame are applicable, descriptions are omitted.

In the Length/Type (F343) and the Opcode (F344), values for identifying the frame as a λSET_ACK frame, an MPCP control frame, or a user data frame are stored and they are used for the OLT 10 and the ONU 20 to transfer the frame depending on its type. For example, when sending a λSET_ACK frame, the OLT 10 stores "0x8808" in the Length/Type (F343) and "0x0008" in the Opcode (F344).

In the Flags (F346), information indicating whether the ONU 20 has completed the wavelength setting is stored. For example, if the wavelength setting has properly been completed in the ONU 20, the ONU 20 stores "0x01" in the Flags (F346); if the wavelength setting is not properly completed, it stores "0x00" in the Flags (F346).

In the Echoed US wavelength ID (F347), the identifier of an upstream wavelength λU for the ONU 20 determined by the wavelength assignment controller 151 in the OLT 10 is stored. Specifically, in the Echoed US wavelength ID (F347), the same identifier as the Assigned US wavelength ID (F326) in the λSET frame is stored. For example, if the upstream wavelength λU1 has been assigned, the ONU 20 stores a value "0x01" in the Echoed US wavelength ID (F347).

In the Echoed DS wavelength ID (F348), the identifier of a downstream wavelength λD for the ONU 20 determined by the wavelength assignment controller 151 in the OLT 10 is stored. Specifically, in the Echoed DS wavelength ID (F348), the same identifier as the Assigned DS wavelength ID (F327) in the λSET frame is stored. For example, if the downstream wavelength λD 1 has been assigned, the ONU 20 stores a value "0x01" in the Echoed DS wavelength ID (F348).

In a WDM/TDM-PON system, Embodiment 1 calculates an average effective bandwidth per ONU 20 Beff(λ) at each wavelength based on the FEC code rates 1712 for the ONUs 20 and determines the wavelength assignment to the ONUs 20 so that the difference in the calculated average effective bandwidth Beff(λ) will be minimum. This approach can eliminate the unfairness in communication bandwidth among the wavelengths. In turn, the elimination of the unfairness among the wavelengths enables the FEC code rates 1712 for individual ONUs 20 to be set at values that allow transmission with reliability and at high transmission efficiency. Accordingly, Embodiment 1 can improve the throughput in the WDM/TDM-PON system.

Embodiment 2

The foregoing Embodiment 1 is an embodiment to achieve wavelength assignment so that the average effective bandwidth per ONU 20 will be fair among the wavelengths in a WDM/TDM-PON system including ONUs 20 having different FEC code rates 1712.

Embodiment 2 is an embodiment to achieve wavelength assignment so that the average effective bandwidth per ONU 20 will be fair among the wavelengths in a WDM/TDM-PON system including ONUs 20 having different transmission rates.

A PON system supporting a plurality of transmission rates is defined by existing standards; for example, the 10G-EPON and the 1G-EPON may be implemented in the same optical network. Such an optical network includes ONUs 20 having a transmission rate of 10 Gbps and ONUs 20 having a transmission rate of 1 Gbps together. Hereinafter, differences from Embodiment 1 are mainly described.

Figure 9:
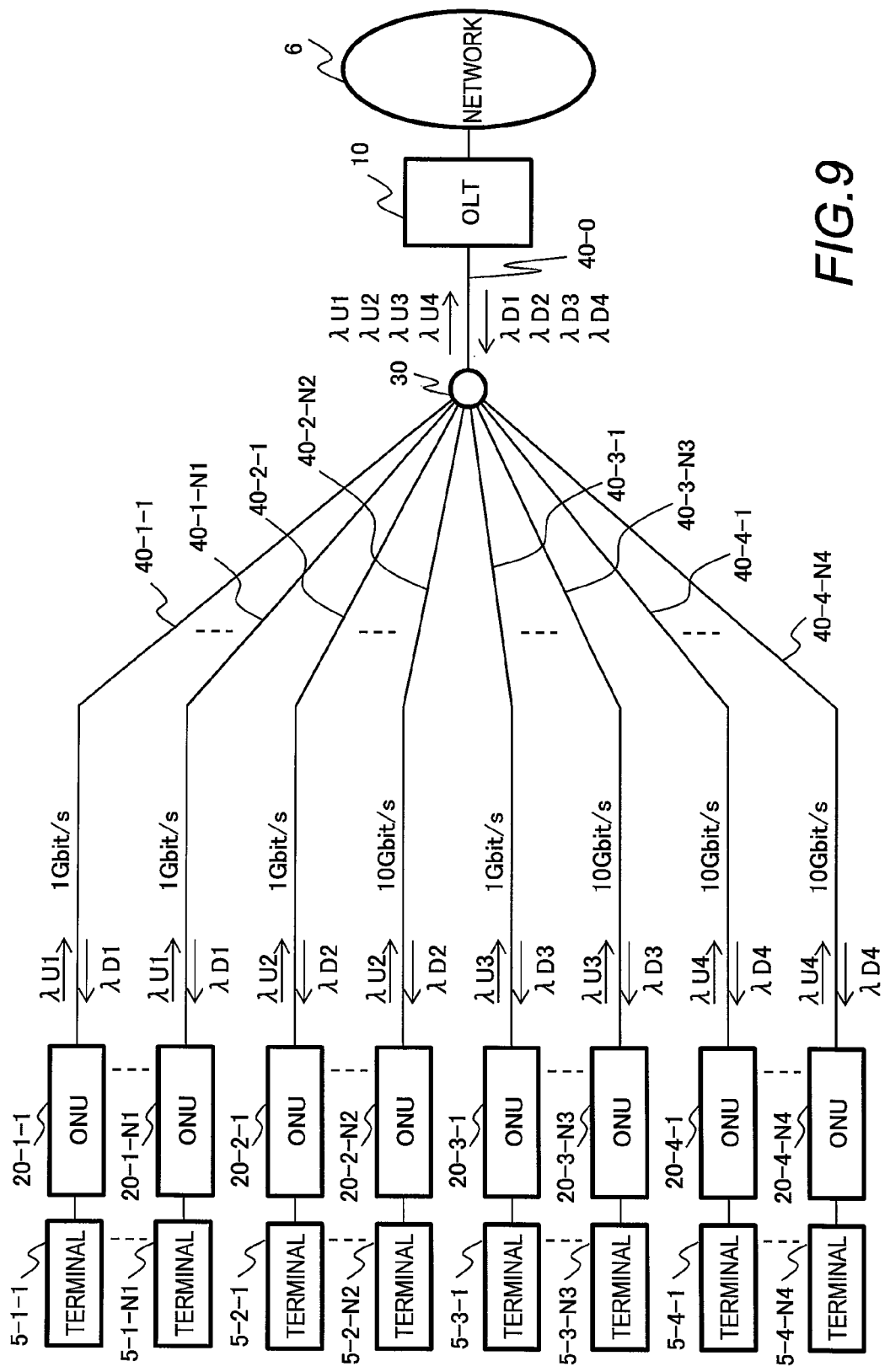
FIG. 9 is a block diagram illustrating an optical access network employing the WDM/TDM-PON in Embodiment 2.

FIG. 9 is a block diagram illustrating an optical access network employing the WDM/TDM-PON in Embodiment 2.

Before wavelength assignment in Embodiment 2, ONUs 20-1-1 to ONU 20-1-N1 communicate using an upstream wavelength λU1 and a downstream wavelength λD1; ONUs 20-2-1 to ONU 20-2-N2 communicate using an upstream wavelength λU2 and a downstream wavelength λD2; ONUs 20-3-1 to ONU 20-3-N3 communicate using an upstream wavelength λU3 and a downstream wavelength λD3; and ONUs 20-4-1 to ONU 20-4-N4 communicate using an upstream wavelength λU4 and a downstream wavelength λD4, like in Embodiment 1.

Unlike in Embodiment 1, however, each ONU 20 in Embodiment 2 sends and receives optical signals at a transmission rate of 10 Gbps or 1 Gbps. For example, the transmission rate of the ONU 20-1-1 is 1 Gbps and the transmission rate of the ONU 20-4-N4 is 10 Gbps. The FEC code rates of the ONUs 20 in Embodiment 2 are the same, unlike the FEC code rates in Embodiment 1.

Except for the above-described differences, the WDM/TDM-PON system in Embodiment 1 and the WDM/TDM-PON system in Embodiment 2 are the same.

Figure 10:
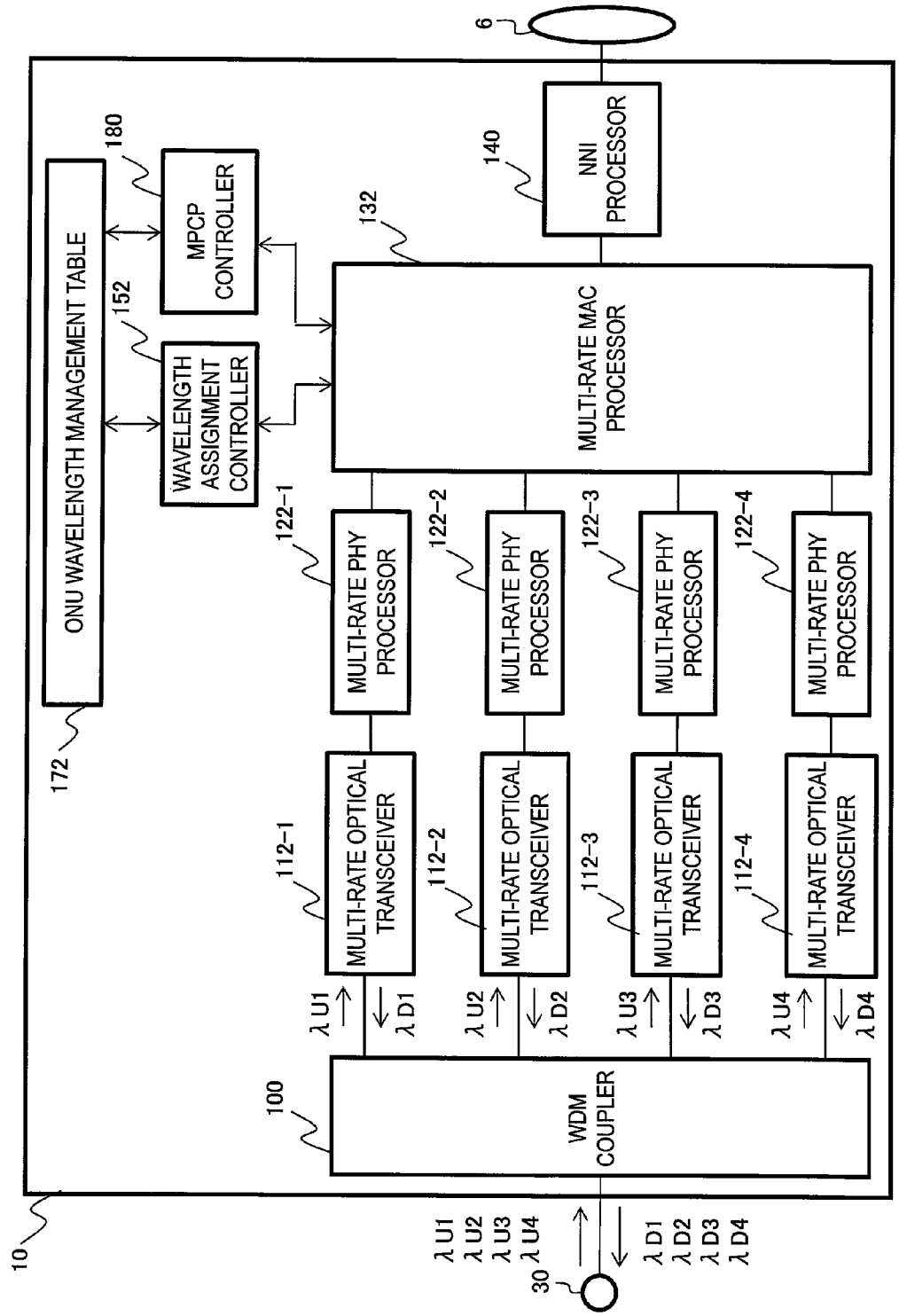
FIG. 10 is a block diagram illustrating a configuration of an OLT in Embodiment 2.

FIG. 10 is a block diagram illustrating a configuration of an OLT 10 in Embodiment 2.

The OLT 10 in Embodiment 2 includes a WDM coupler 100, multi-rate optical transceivers 112 (112-1 to 112-4), multi-rate PHY processors 122 (122-1 to 122-4), a multi-rate MAC processor 132, an NNI processor 140, a wavelength assignment controller 152, an ONU wavelength management table 172, and an MPCP controller 180. The WDM coupler 100, the NNI processor 140, and the MPCP controller 180 have the same functions in Embodiment 1 and Embodiment 2.

Major differences in configuration between the OLT 10 in Embodiment 1 and the OLT 10 in Embodiment 2 are described as follows. The first difference is that the OLT 10 in Embodiment 2 does not have an FEC controller 160.

The second difference is that the OLT 10 in Embodiment 2 supports the rates of 10 Gbps and 1 Gbps. The multi-rate optical transceivers 112, the multi-rate PHY processors 122, and the multi-rate MAC processor 132 in Embodiment 2 respectively correspond to the optical transceivers 111, the PHY processors 121, and the MAC processor 131 in Embodiment 1; they support the rates of 10 Gbps and 1 Gbps.

The third difference is that the OLT 10 in Embodiment 2 uses different transmission rates depending on the ONU 20 instead of using different FEC code rates depending on the ONU 20. Accordingly, the wavelength assignment controller 152 and the ONU wavelength management table 172 have functions different from those of the wavelength assignment controller 151 and the ONU wavelength management table 171 in Embodiment 1. Hereinbelow, the functions different from those in Embodiment 1 are described.

The multi-rate optical transceivers 112-1 to 112-4 receive upstream optical signals having upstream wavelengths λU1 to λU4 fed by the WDM coupler 100. The upstream optical signal to be received is a burst optical signal obtained by time-division multiplexing a 10-Gbps optical signal and a 1-Gbps optical signal.

Each multi-rate optical transceiver 112 converts the received upstream optical signal into an electric current signal and further converts the electric current signal into a voltage signal. Then, it splits the obtained voltage signal into a 10-Gbps signal and a 1-Gps signal, amplifies them, and feeds the amplified 10-Gbps electric signal and 1-Gbps electric signal to one of the multi-rate PHY processors 122-1 to 122-4.

Each multi-rate optical transceiver 112 also converts electric signals at 10 Gbps and 1 Gbps fed by one of the multi-rate PHY processors 122-1 to 122-4 into optical signals having one of the downstream wavelengths λD1 to λD4 and feeds the obtained optical signal to the WDM coupler 100.

Each of the multi-rate PHY processors 122-1 to 122-4 extracts a clock from the electric signal obtained by time-division multiplexing a 10-Gbps signal and a 1-Gbps signal fed by each of the multi-rate optical transceivers 112-1 to 112-4 and retimes the electric signal with the extracted clock. Then, each multi-rate PHY processor 122 converts the received electric signal into a digital signal.

Furthermore, each multi-rate PHY processor 122 performs decoding on the digital signal, performs FEC decoding on the digital signal as necessary, and further extracts a frame from the digital signal. Then, each multi-rate PHY processor 122 feeds the extracted frame to the multi-rate MAC processor 132.

Each multi-rate PHY processor 122 also encodes a frame fed by the multi-rate MAC processor 132, performs FEC encoding as necessary, and converts a coded frame into an electric signal waveform based on a clock held by the OLT 10 to generate an electric signal. Each multi-rate PHY processor 122 feeds the generated electric signal to one of the multi-rate optical transceivers 112-1 to 112-4.

The multi-rate MAC processor 132 analyzes header information in frames received from the multi-rate PHY processors 122-1 to 122-4 to identify whether each frame is a user data frame or a control frame. If the received frame is a user data frame, the multi-rate MAC processor 132 aggregates user data frames sent from the multi-rate PHY processors 122 to feed the aggregated user data frames to the NNI processor 140.

If the received frame is a control frame, the multi-rate MAC processor 132 further identifies the type of the control frame and feeds it to the wavelength assignment controller 151 or the MPCP controller 180 depending on the type of the control frame, like the MAC processor 131 in Embodiment 1.

The multi-rate MAC processor 132 also distributes user data frames received from the NNI processor 140, wavelength assignment control frames received from the wavelength assignment controller 152, and MPCP control frames received from the MPCP controller 180 to the multi-rate PHY processors 122 in accordance with the destination address included in the frame. The multi-rate MAC processor 132 multiplexes the user data frames and control frames by destination address and feeds the obtained multiplex frames to the multi-rate PHY processors 122-1 to 122-4.

The wavelength assignment controller 152 extracts a wavelength to be used in transmission or receiving by an ONU 20 with reference to the ONU wavelength management table 172. Furthermore, the wavelength assignment controller 152 creates and terminates a wavelength assignment control frame for setting the extracted wavelength to the ONU 20. The format of the wavelength assignment control frame in Embodiment 2 is the same as the format of the λSET frame or λSET_ACK frame in Embodiment 1.

The ONU wavelength management table 172 in Embodiment 2 differs from the ONU wavelength management table 171 in Embodiment 1. The ONU wavelength management table 172 holds relations among a ONU identifier, a transmission rate of the ONU 20, and an identifier of the transmission and receiving wavelengths. A specific example of the ONU wavelength management table 172 will be described later.

The OLT 10 as configured in Embodiment 2 can send and receive optical signals at transmission rates different depending on the ONU 20, calculate transmission and receiving wavelengths for the individual ONUs 20 based on the transmission rates of the ONUs 20. The OLT 10 can further send and receive control frames for setting the wavelengths to the ONUs 20.

Figures 11, 12:
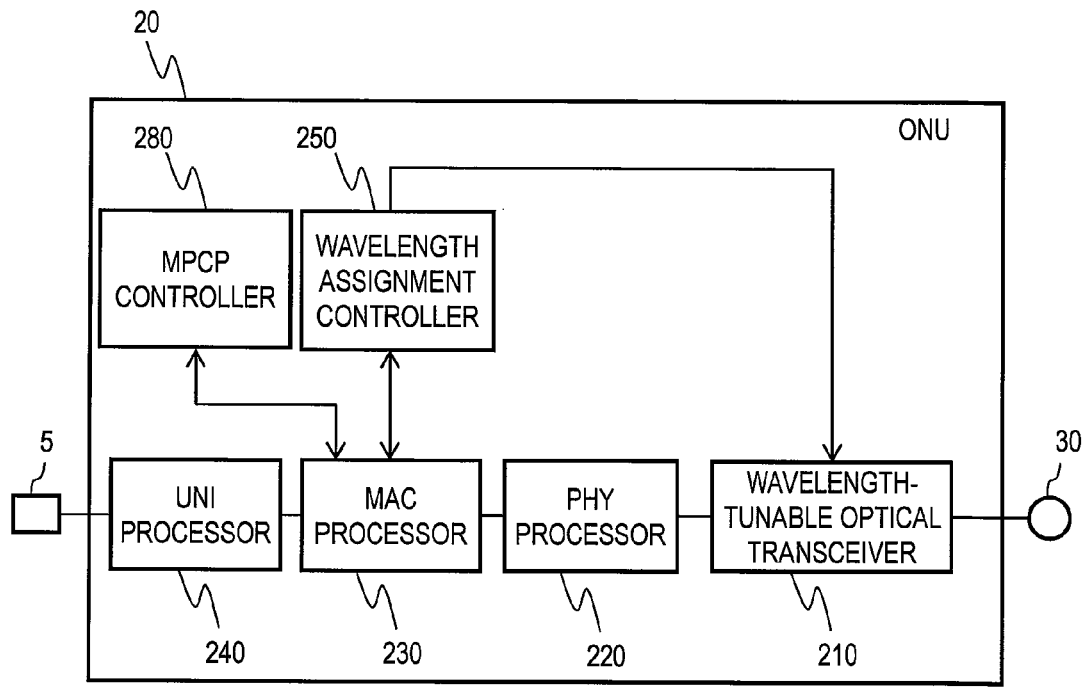
FIG. 11 is a block diagram illustrating a configuration of an ONU in Embodiment 2.
FIG. 12 is an explanatory diagram illustrating an ONU wavelength management table in Embodiment 2.

FIG. 11 is a block diagram illustrating a configuration of an ONU 20 in Embodiment 2.

The ONU 20 includes a wavelength-tunable optical transceiver 210, a PHY processor 220, a MAC processor 230, a UNI processor 240, a wavelength assignment controller 250, and an MPCP controller 280.

A major difference between the configuration of the ONU 20 in Embodiment 1 and the configuration of the ONU 20 in Embodiment 2 is that the ONU 20 in Embodiment 2 does not have an FEC controller 260. The functional components in the ONU 20 in Embodiment 2 are the same as those in Embodiment 1, except for the FEC controller 260. However, depending on the transmission rate of the ONU 20, the bit rate supported by the wavelength-tunable optical transceiver 210, the PHY processor 220, and the MAC processor 230 is different.

If the ONU 20 supports a transmission rate of 10 Gbps, the wavelength-tunable optical transceiver 210, the PHY processor 220, and the MAC processor 230 all support 10 Gbps. If the ONU 20 supports a transmission rate of 1 Gbps, the wavelength-tunable optical transceiver 210, the PHY processor 220, and the MAC processor 230 all support 1 Gbps.

Next, the ONU wavelength management table 172 held by the OLT 10 in Embodiment 2 of this invention.

FIG. 12 is an explanatory diagram illustrating the ONU wavelength management table 172 in Example 2.

The ONU wavelength management table 172 holds relations among an ONU identifier 1721, a transmission rate 1722, and a wavelength identifier 1723. The ONU identifier 1721 and the wavelength identifier 1723 are the same as the ONU identifier 1711 and the wavelength identifier 1713 in Embodiment 1.

The transmission rate 1722 is a value measured or detected in communications with the ONU 20 in the discovery process 310. In this embodiment, the OLT 10 and the ONUs 20 communicate using two kinds of transmission rates: 10 Gbps and 1 Gbps.

For example, it is assumed that an ONU 20 having an ONU identifier 1721 of "1" communicates at a transmission rate of 10 Gbps, an upstream wavelength λU1, and a downstream wavelength λD1. In the row of FIG. 12 including the ONU identifier 1721 of "1", the transmission rate 1722 is "10G" and the wavelength identifier 1723 is "1".

It is also assumed that an ONU 20 having an ONU identifier 1721 of "2" communicates at a transmission rate of 1 Gbps, an upstream wavelength of λU4, and a downstream wavelength of λD4. In the row of FIG. 12 having the ONU identifier 1721 of "2", the transmission rate 1722 is "1G" and the wavelength identifier 1723 is "4".

The ONU identifier 1721 in FIG. 12 is one of the values of 1 to 256; however, it may be the MAC address or the serial number of the ONU 20, as far as the value can identify the ONU 20.

Next, processing by the wavelength assignment controller 152 in Embodiment 2 of this invention is described. The processing illustrated in FIG. 5 applies to the processing of the wavelength assignment controller 152 in Embodiment 2, but the transmission rate 1722 can be a plurality of values in calculating average effective bandwidths per ONU 20 at S303 and assigning wavelengths at S306.

At S303, the wavelength assignment controller 152 calculates average effective bandwidths per ONU 20 Beff(λ) using Formula 1.

For example, in the case where the transmission rate between an ONU 20-1-1 and the OLT 10 is 10 Gbps, the wavelength assignment controller 152 acquires a value 10 Gbps for the effective transmission rate. In the case where the transmission rate between a different ONU 20-1-2 and the OLT 10 is 1 Gbps, the wavelength assignment controller 152 acquires a value 1 Gbps for the effective transmission rate.

If these two ONUs 20 are assigned the same wavelength λ1, the wavelength assignment controller 152 calculates an average effective bandwidth per ONU 20 Beff(λ1) at the wavelength λ1 by the foregoing Formula 1 as follows:

Beff(λ1)=1/[1/10 Gbps+1/1 Gbps]=0.909 Gbps

The transmission rates of the ONUs 20 at each wavelength are acquired in the discovery process 310 and the acquired transmission rates are stored in the ONU wavelength management table 172; accordingly, the wavelength assignment controller 152 in Embodiment 2 can calculate the average effective bandwidth per ONU 20 Beff(λ) at each wavelength using Formula 1.

At S306, the wavelength assignment controller 152 calculates the assignment of transmission and receiving wavelengths to the ONUs 20 to eliminate the unfairness in bandwidth among the wavelengths based on the transmission rates of the ONUs 20.

Now, some specific methods of assigning wavelengths at 5306 in Embodiment 2 are provided.

The first method of assigning wavelengths in Embodiment 2 is that the wavelength assignment controller 151 calculates an evaluation value (Beff_max/Beff_min) indicating the unfairness for every potential combination of wavelengths which might be assigned to the ONUs 20 based on the transmission rate. The wavelength assignment controller 152 extracts a combination of wavelengths with which the evaluation value (Beff_max/Beff_min) is smallest from all of the potential combinations and determines the extracted combination of wavelengths to be assigned to the ONUs 20.

The first method of assigning wavelengths in Embodiment 2 is the same as the first method of assigning wavelengths in Embodiment 1. However, it is different from the first method in Embodiment 1 in the point that the evaluation value (Beff_max/Beff_min) is obtained based on the transmission rate only.

The second method of assigning wavelengths is that the wavelength assignment controller 152 determines the wavelengths to be assigned to the ONUs 20 so that the number of ONUs 20 at each transmission rate will be as fair as possible among the wavelengths.

The following description provides an example of a four-wavelength multiplex WDM/TDM-PON system including only two groups of ONUs 20, one having the transmission rate 1722 of 10 Gbps and the other having the transmission rate 1722 of 1 Gbps. It is assumed that the group of the transmission rate 1722 of 10 Gbps consists of 32 ONUs 20 and the group of the transmission rate 1722 of 1 Gbps consists of 16 ONUs 20, namely, a total of 48 ONUs 20 are registered in the OLT 10.

In this case, the wavelength assignment controller 152 divides the ONUs 20 having the transmission rate of 10 Gbps into four groups of eight ONUs and assigns the four groups to different wavelengths. The wavelength assignment controller 152 divides the ONUs 20 having the transmission rate of 1 Gbps into four groups of four ONUs and assigns the four groups to different wavelengths.

Through these operations, the number of ONUs 20 having the transmission rate 1722 of 10 Gbps are fair among the wavelengths and the number of ONUs 20 having the transmission rate 1722 of 1 Gbps are fair among the wavelengths. As a result, the average effective bandwidths per ONU 20 Beff(λ) will be fair in all the wavelengths; accordingly, the wavelength assignment controller 152 attains the fairness among the wavelengths.

The third method of assigning wavelengths in Embodiment 2 is that the wavelength assignment controller 152 assigns an ONU 20 newly registered in the OLT 10 the wavelength at which the average effective bandwidth Beff(λ) has been broadest until the registration of the new ONU 20. The third method of assigning wavelengths in Embodiment 2 is the same as the third method in Embodiment 1.

The wavelength assignment when an ONU 20 is newly registered in Embodiment 2 is described. The basic processing is the same as that in Embodiment 1 shown in FIG. 6; however, processing in the discovery process 310 is partially different between Embodiment 1 and Embodiment 2.

The difference at the discovery process 310 is that the FEC code rate 1712 for the newly registered ONU 20 is determined in the discovery process 310 in Embodiment 1 but the transmission rate 1722 of the newly registered ONU 20 is detected in the discovery process 310 in Embodiment 2.

The determining the wavelength assignment (step 311) after the discovery process 310 in Embodiment 2 and the setting of wavelengths to the ONUs 20 (steps 312 to 315) are the same in Embodiment 1 and Embodiment 2; accordingly, explanation thereof is omitted.

Through the above-described wavelength assignment, Embodiment 2 can also register a new ONU 20, determine wavelengths to be assigned to the ONUs 20 so that the bandwidth will be fair among the wavelengths, and set transmission and receiving wavelengths to the ONUs 20.

Effects of Embodiment 2 of this invention are described. In a WDM/TDM-PON system, Embodiment 2 can configure the wavelengths for the ONUs 20 with the wavelength assignment controller 152 so that the differences in average effective bandwidth per ONU 20 among the wavelengths will be minimum based on the transmission rates of the ONUs 20. This approach can eliminate the unfairness in communication bandwidth among the wavelengths. In turn, the elimination of the unfairness enables the transmission rates for individual ONUs 20 to be set at values that allow transmission with reliability and at high transmission efficiency. Accordingly, Embodiment 2 can improve the throughput in the WDM/TDM-PON system.

In other cases than those of Embodiment 1 and Embodiment 2, different effective transmission rates may coexist. For example, if the bandwidth specified by a communication service contract is different among subscribers, the maximum bandwidth for an ONU 20 may be limited in accordance with the contract. As a result, different effective transmission rates coexist in a network system.

In such a case, the OLT 10 configures the assignment of transmission and receiving wavelengths for the ONUs 20 based on the bandwidths contracted for the ONUs 20 to likewise reduce the unfairness among the wavelengths. Specifically, the ONU wavelength management table 172 stores a value of the maximum bandwidth in the contracted bandwidth is stored in the transmission rate 1722, so that the wavelength assignment controller 152 can assign the ONUs 20 wavelengths by the method as described in Embodiment 2.

Determining the wavelength to be assigned depending on the contracted bandwidth allows the OLT 1 in this embodiment to calculate an effective transmission rate $R(\lambda,i)$ based on the bandwidth set by the operator or administrator.

The foregoing has been described assuming that four kinds of wavelengths are multiplexed between the OLT 10 and the ONUs 20; however, the number of wavelengths to be multiplexed may be any value not less than 2.

Embodiment 1 has been described assuming that two kinds of FEC code rate are provided; however, the number of the kinds of FEC code rate may be three or more.

Embodiment 2 has been described assuming that two kinds of transmission rate are provided; however, three or more kinds of transmission rate are applicable.

Embodiment 1 has described a case including different FEC code rates only and Embodiment 2 has described a case including different transmission rates only; however, this invention is applicable to a case where different FEC code rates and different transmission rates are both included. In such a case, the wavelength assignment controller 151 or 152 calculates the effective transmission rate $R(\lambda,i)$ in Formula 1 by multiplication of an FEC code rate by a transmission rate.

In the discovery process 310 in this case, the OLT 10 (for example, the MPCP controller 180) determines the FEC code rate for a newly registered ONU 20 and further detects the transmission rate of the ONU 20. The wavelength assignment controller 151 or the MPCP controller 180 stores the determined FEC code rate and the detected transmission rate to the ONU wavelength management table 171 or 172.

In the above-described embodiments, the upstream wavelength $\lambda U$ and the downstream wavelength $\lambda D$ are assigned concurrently, but this is not a requirement. For example, in a system allowing different FEC code rates in upstream transmission and downstream transmission, an ONU 20 can be assigned an upstream wavelength $\lambda U$ based on the FEC code rate for upstream communications and a downstream wavelength $\lambda D$ based on the FEC code rate for downstream communications, so that this invention is applicable.

The foregoing has been described based on the frames defined by the 10G-EPON; however, the OLT 10 and the ONUs 20 in this invention may use frames defined by other TDM-PON, such as E-PON, G-PON, or XG-PON.

The foregoing embodiments have been provided for the WDM/TDM-PON system; however, this invention is equivalently applicable to any wavelength-division multiplexing type of PON system, for example, a WDM/OFDM-PON system.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, and processors, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card.

The drawings shows control lines and information lines as considered necessary for explanations but do not show all control lines or information lines in the products. It can be considered that almost of all components are actually interconnected.

What is claimed is:

1. A network system comprising:
a plurality of subscriber apparatuses; and
a station-side apparatus which communicates with the subscriber apparatuses using wavelengths,
wherein the station-side apparatus acquires code rates to be used in error correction control performed in communications between the subscriber apparatuses and the station-side apparatus,
wherein the station-side apparatus calculates effective transmission rates of the subscriber apparatuses based on the acquired code rates, and
wherein the station-side apparatus determines which of the wavelengths are to be used by each of the subscriber apparatuses based on average effective transmission bandwidths which are calculated based on the effective transmission rates of the subscriber apparatuses using the respective wavelengths in communications.

2. The network system according to claim 1,
wherein the station-side apparatus sends information indicating the determined wavelengths to set the determined wavelengths for each of the subscriber apparatuses to each of the subscriber apparatuses, and
wherein the station-side apparatus receives information indicating that the determined wavelength has been set from each of the subscriber apparatuses, respectively.

3. The network system according to claim 1,
wherein the station-side apparatus determines which of the wavelengths are to be used by each of the subscriber apparatuses where an absolute value of a difference in the average effective transmission bandwidths among the wavelengths is equal to or smaller than a threshold value or a quotient of the average effective transmission rates at the wavelengths is within a predetermined range.

4. The network system according to claim 3,
wherein the station-side apparatus holds wavelength information indicating the subscriber apparatuses and the wavelengths to be used by the subscriber apparatuses,
wherein the station-side apparatus extracts the subscriber apparatuses for the respective wavelengths from the wavelength information, and
wherein the station-side apparatus calculates the average effective transmission bandwidth at each of the wavelengths based on the effective transmission rates of the extracted subscriber apparatuses.

5. The network system according to claim 1,
wherein the station-side apparatus acquires transmission rates assigned to the subscriber apparatuses as the effective transmission rates of the subscriber apparatuses, and
wherein the station-side apparatus determines which of the wavelengths are to be used by each of the subscriber apparatuses based on the acquired effective transmission rates.

6. The network system according to claim 1,
wherein the station-side apparatus holds information on transmission bandwidths assigned to the subscriber apparatuses by contracts, and
wherein the station-side apparatus calculates the effective transmission rates of the subscriber apparatuses based on the information on the transmission bandwidths.

7. A station-side apparatus for communicating with subscriber apparatuses, the station-side apparatus comprising:
a communication interface for communicating with the subscriber apparatuses using wavelengths; and
a controller configured to:

acquire code rates to be used in error correction control performed in communications between the subscriber apparatuses and the station-side apparatus, calculate effective transmission rates of the subscriber apparatuses based on the acquired code rates, and determine which of the wavelengths are to be used by each of the subscriber apparatuses based on average effective transmission bandwidths which are calculated based on the effective transmission rates of the subscriber apparatuses using the respective wavelengths in communications.

8. The station-side apparatus according to claim 7, wherein the communication interface sends information indicating the determined wavelengths to set the determined wavelengths for each of the subscriber apparatuses to each of the subscriber apparatuses, and wherein the communication interface receives information indicating that the determined wavelength has been set from each of the subscriber apparatuses, respectively.

9. The station-side apparatus according to claim 7, wherein the controller determines which of the wavelengths are to be used by each of the subscriber apparatuses where an absolute value of a difference in the average effective transmission bandwidths among the wavelengths is equal to or smaller than a threshold value or a quotient of the average effective transmission rates at the wavelengths is within a predetermined range.

10. The station-side apparatus according to claim 9, further comprising a storage device storing wavelength information indicating the subscriber apparatuses and the wavelengths to be used by the subscriber apparatuses, wherein the controller extracts subscriber apparatuses for each of the wavelengths from the wavelength information, and wherein the controller calculates the average effective transmission bandwidth at each of the wavelengths based on the effective transmission rates of the extracted subscriber apparatuses.

11. The station-side apparatus according to claim 7, wherein the controller acquires transmission rates assigned to the subscriber apparatuses as the effective transmission rates of the subscriber apparatuses, and wherein the controller apparatus determines which of the wavelengths are to be used by each of the subscriber apparatuses based on the acquired effective transmission rates.

12. The station-side apparatus according to claim 7, further comprising:

a storage device storing information on transmission bandwidths assigned to the subscriber apparatuses by contracts, wherein the controller calculates the effective transmission rates of the subscriber apparatuses based on the information on the transmission bandwidths.

13. A method of controlling communications by a station-side apparatus communicating with subscriber apparatuses, the method comprising:

communicating with the subscriber apparatuses using wavelengths;

acquiring code rates to be used in error correction control performed in communications between the subscriber apparatuses and the station-side apparatus, calculating effective transmission rates of the subscriber apparatuses based on the acquired code rates, and determining which of the wavelengths are to be used by each of the subscriber apparatuses based on average effective transmission bandwidths which are calculated based on the effective transmission rates of the subscriber apparatuses using the respective wavelengths in communications.

* * * * *